United States Patent
Papakostas

(10) Patent No.: US 9,766,742 B2
(45) Date of Patent: Sep. 19, 2017

(54) CONTACT SENSOR

(71) Applicant: R&D CORE LIMITED, Leatherhead (GB)

(72) Inventor: Thomas Papakostas, Leatherhead (GB)

(73) Assignee: R&D CORE LIMITED, Leatherhead Surrey (GB)

( * ) Notice: Subject to any disclaimer, the term of this patent is extended or adjusted under 35 U.S.C. 154(b) by 101 days.

(21) Appl. No.: 14/649,789

(22) PCT Filed: Dec. 5, 2013

(86) PCT No.: PCT/GB2013/053214
§ 371 (c)(1),
(2) Date: Jun. 4, 2015

(87) PCT Pub. No.: WO2014/087164
PCT Pub. Date: Jun. 12, 2014

(65) Prior Publication Data
US 2015/0309651 A1  Oct. 29, 2015

(30) Foreign Application Priority Data
Dec. 5, 2012 (GB) .................................. 1221915.0

(51) Int. Cl.
*G06F 3/041* (2006.01)
*G06F 3/045* (2006.01)
*G06F 3/047* (2006.01)

(52) U.S. Cl.
CPC ............ *G06F 3/0416* (2013.01); *G06F 3/045* (2013.01); *G06F 3/047* (2013.01); *G06F 3/0414* (2013.01); *G06F 2203/04103* (2013.01)

(58) Field of Classification Search
None
See application file for complete search history.

(56) References Cited

U.S. PATENT DOCUMENTS 3,662,105 A  5/1972  Hurst et al.
4,484,026 A  11/1984  Thornburg
(Continued)

FOREIGN PATENT DOCUMENTS

| GB | 2341978 A | 3/2000 |
| GB | 2343516 A | 5/2000 |
| WO | 9210823 A1 | 6/1992 |

OTHER PUBLICATIONS

Mar. 21, 2014—(WO) International Search Report and Written Opinion—App PCT/GB2013/053214.
(Continued)

*Primary Examiner* — Nicholas Lee
*Assistant Examiner* — Duane N Taylor, Jr.
(74) *Attorney, Agent, or Firm* — Banner & Witcoff, Ltd.

(57) ABSTRACT

A contact sensor apparatus comprises: a first insulative layer (100); a second insulative layer (200); a first resistor strip (101) on the first insulative layer; a second resistor strip (201) on the second insulative layer; a plurality of first conductive traces (102) provided on the first insulative layer and electrically connected to the first resistor strip; and a plurality of second conductive traces (202) provided on the second insulative layer and electrically connected to the second resistor strip. The first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces. The first insulative layer and second insulative layer are spaced apart such that there is no electrical contact between the plurality of first and second conductive traces when a contact is not applied to the contact sensor. When a contact
(Continued)

is applied there is an electrical contact between at least one of each of the plurality of first and second conductive traces in a region of the contact.

20 Claims, 20 Drawing Sheets

(56) References Cited

U.S. PATENT DOCUMENTS

| | | | |
|---|---|---|---|
| 4,564,079 A | | 1/1986 | Moore et al. |
| 4,587,378 A | | 5/1986 | Moore |
| 4,945,651 A | | 8/1990 | Georg |
| 4,963,702 A | * | 10/1990 | Yaniger .................. G06F 3/045 178/18.05 |
| 4,990,725 A | | 2/1991 | Mizzi |
| 5,079,949 A | | 1/1992 | Tamori |
| 5,159,159 A | * | 10/1992 | Asher .................... G01L 1/205 178/18.05 |
| 5,305,017 A | | 4/1994 | Gerpheide |
| 5,623,760 A | | 4/1997 | Newham |
| 5,804,773 A | | 9/1998 | Wilson et al. |
| 5,818,430 A | | 10/1998 | Heiser |
| 5,822,223 A | | 10/1998 | Genest |
| 6,029,358 A | | 2/2000 | Mathiasmeier et al. |
| 6,225,911 B1 | | 5/2001 | Nagamasa et al. |
| 7,609,418 B2 | | 10/2009 | Takahashi |
| 2003/0079920 A1 | | 5/2003 | Rantet |
| 2009/0009482 A1 | | 1/2009 | McDermid |
| 2010/0182276 A1 | | 7/2010 | Tanabe et al. |
| 2012/0089348 A1 | * | 4/2012 | Perlin .................... G06F 3/005 702/41 |
| 2012/0194450 A1 | | 8/2012 | Goncalves et al. |
| 2012/0249472 A1 | | 10/2012 | Hong et al. |
| 2012/0293297 A1 | | 11/2012 | Joguet et al. |

OTHER PUBLICATIONS

Mar. 23, 2013—(GB) Search Report—App 1221915.0.
Feb. 7, 2014—(GB) Examination Report—App 1221915.0.

* cited by examiner

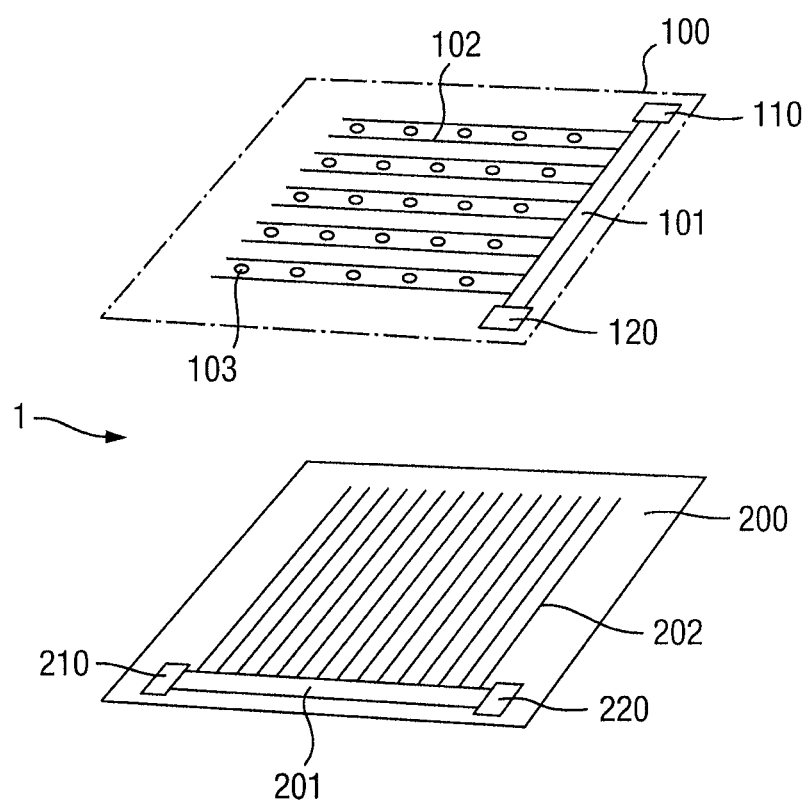

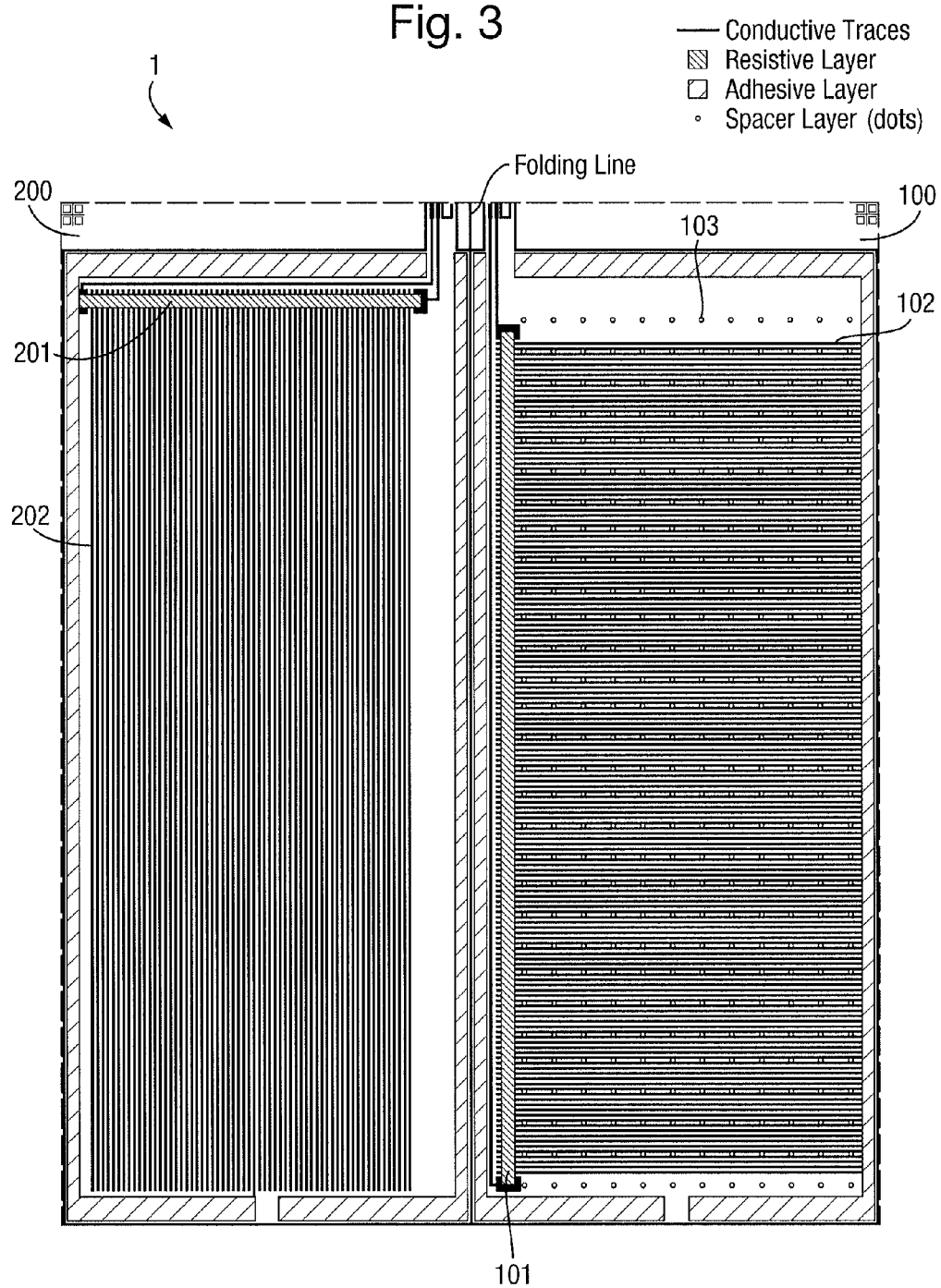

Fig. 5
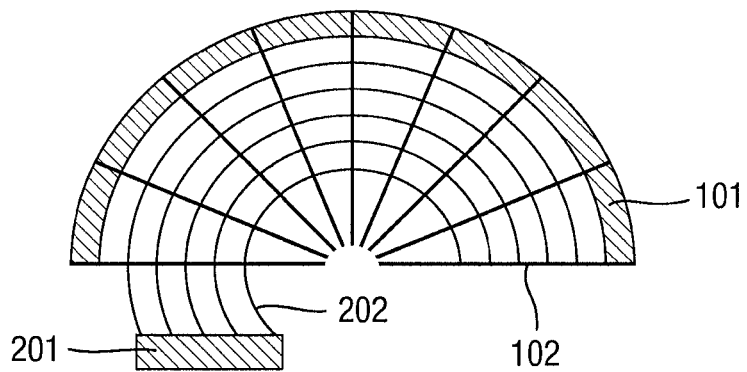
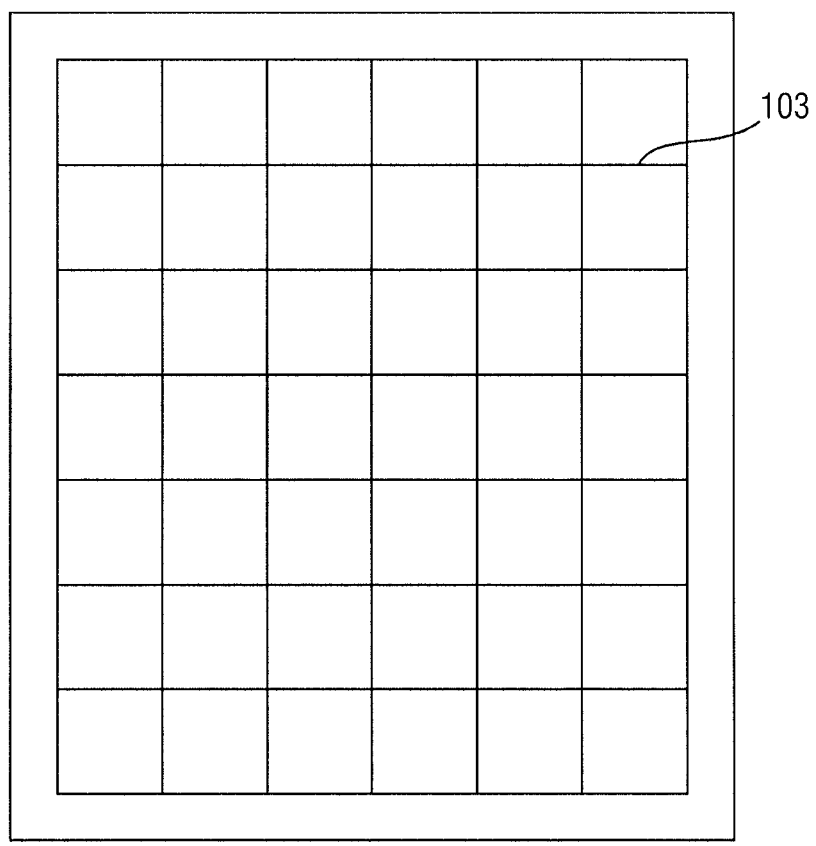
Fig. 6a

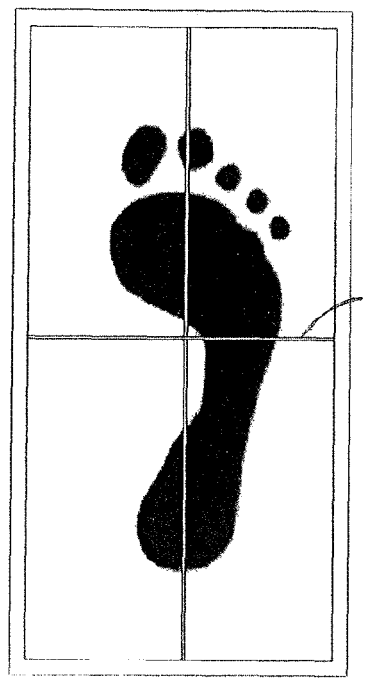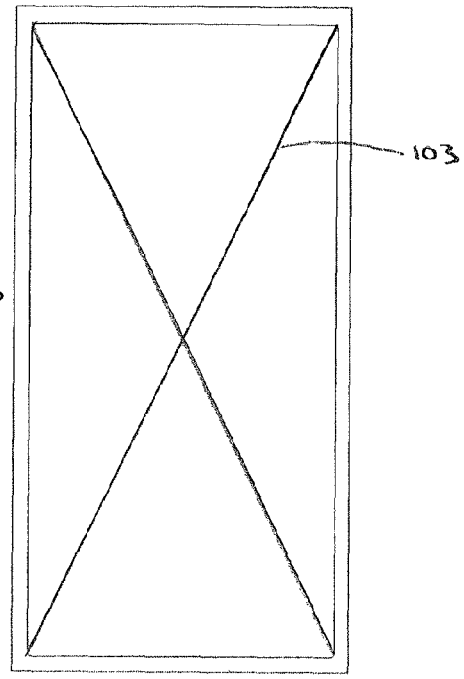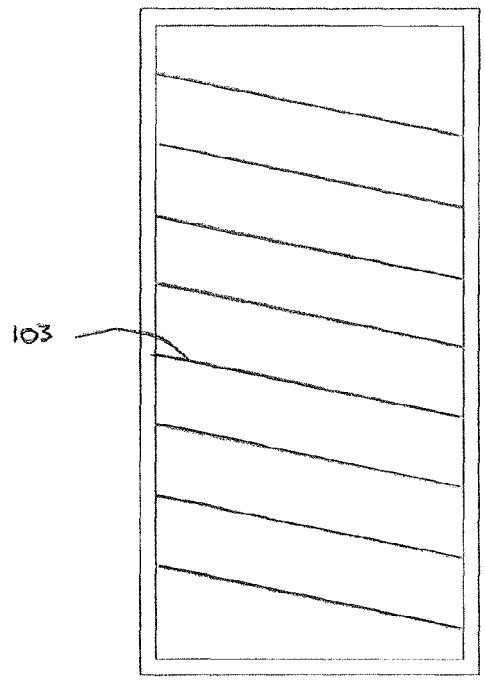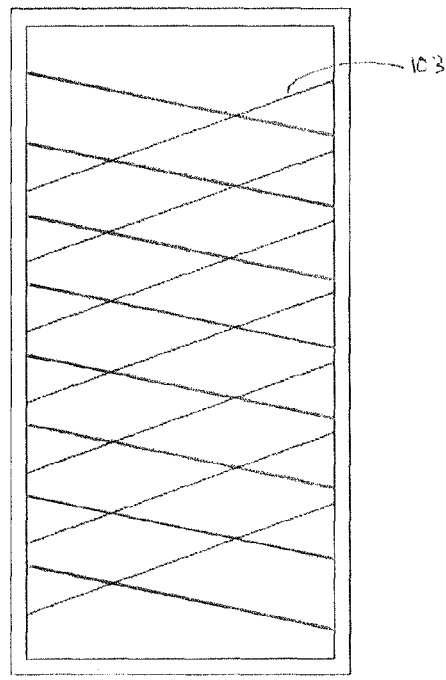
Fig. 6b  Fig. 6c
Fig. 6d  Fig. 6e

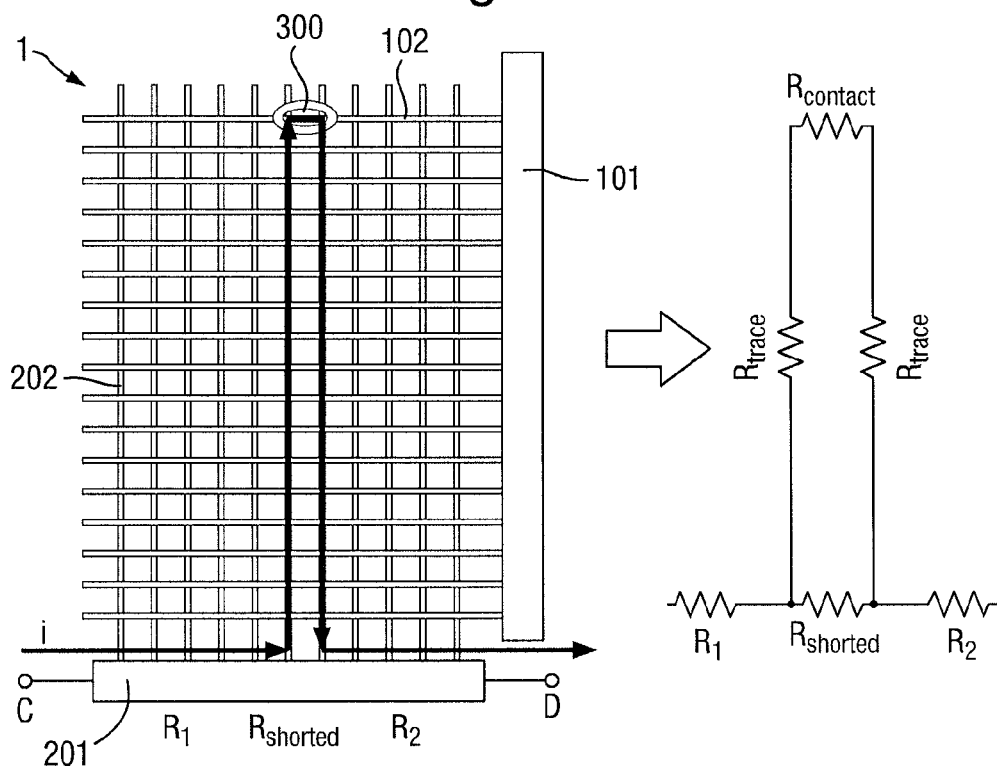
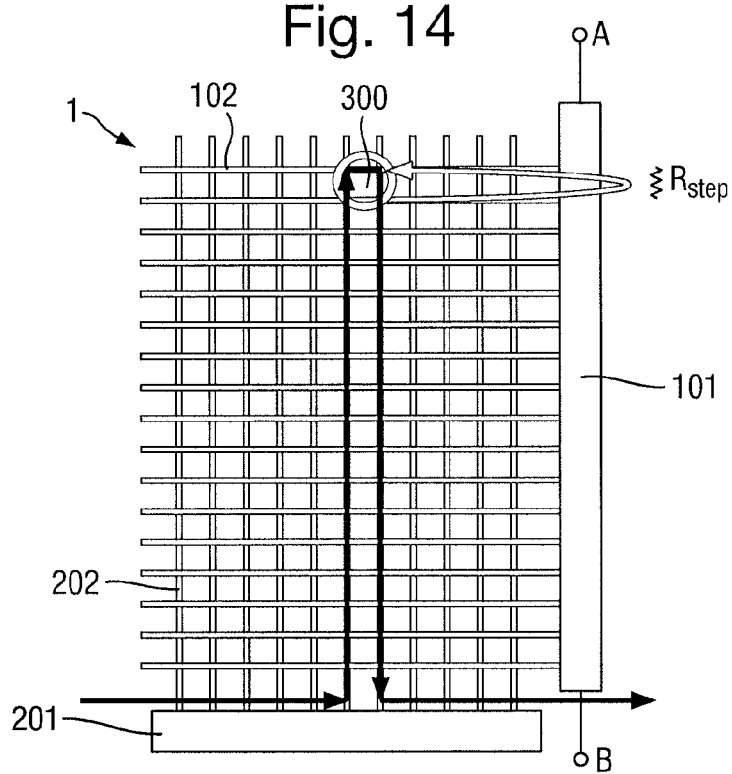

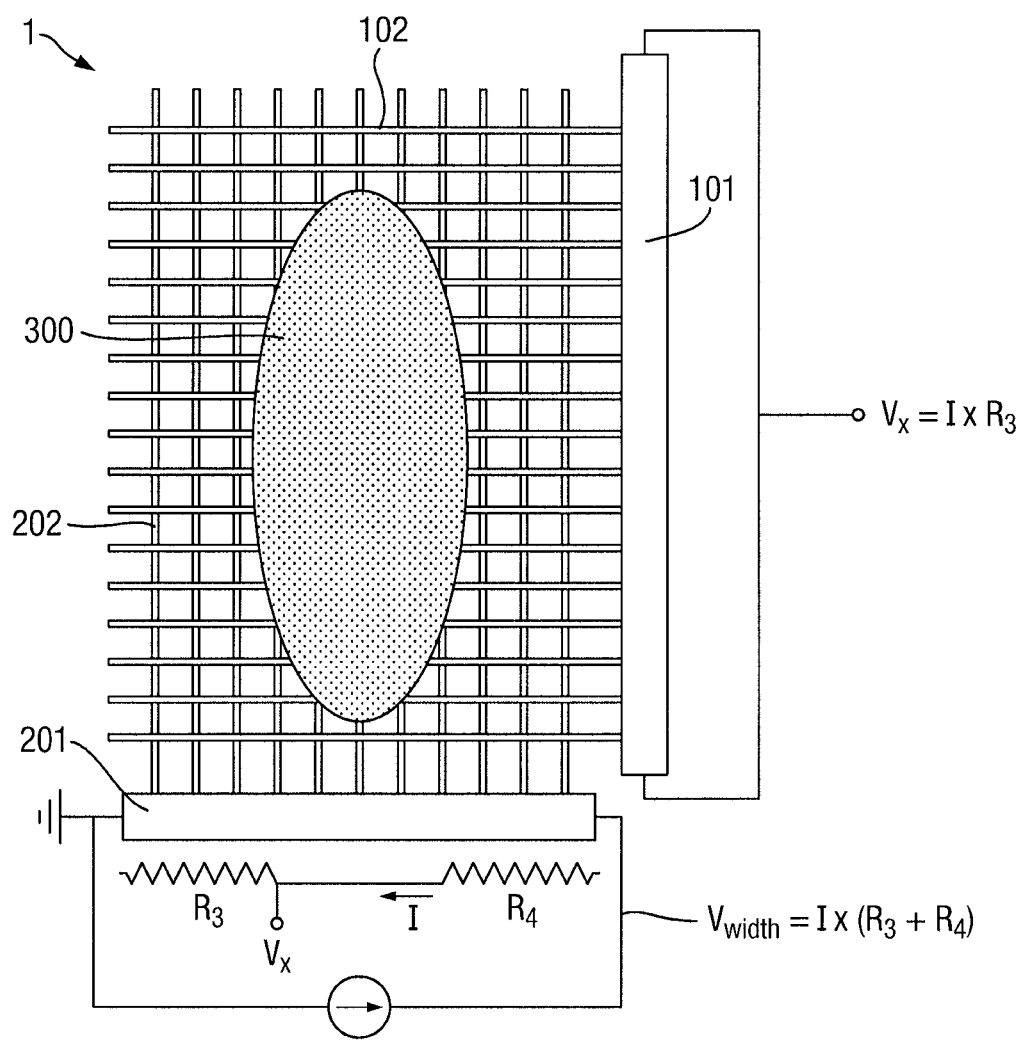

CONTACT SENSOR

The present application is a U.S. National Phase of International Application No. PCT/GB2013/053214, filed on Dec. 5, 2013, designating the United States of America, and claims priority to British Patent Application No. 1221915.0, filed Dec. 5, 2012. This application claims priority to and the benefit of the above-identified applications, each of which is fully incorporated by reference herein.

The present invention relates to a contact sensor. Embodiments of the present invention are able to measure the area and/or location of a contact or contacts applied to the contact sensor.

Contact sensors or touch pads are used in numerous applications. They typically utilise a tactile sensor or an array of tactile sensors in combination with hardware or software processing to provide an indication of a contact by the user. The contact can be made by a finger or using a stylus, or it can be any other kind of contact area. For example a computer touch pad, as used on laptop computers in place of a mouse, detects contact by a user's finger and provides information relating to the location of the contact and movement of the contact point. This information can be used by the computer to control a cursor on screen or to perform other functions.

U.S. Pat. No. 6,029,358 discloses an electronic shoe sizer with a sensing plane that comprises a series of vertically and horizontally distributed transducers connected to vertical drivers and horizontal drivers, respectively. The preferred design employs passive conductive elements driven by AC signals. The presence of the foot is measured by using the local increase in permittivity that arises when the foot is in contact with the sensing plane.

Pressure sensing contact sensors operate by determining a contact in accordance with the pressure applied at the contact area. This type of contact sensor is to be distinguished from capacitive type sensors and other sensors relying on a change in electrical field properties that arise when there is contact at the contact surface, such as the foot sizer described in U.S. Pat. No. 6,029,358. Many computer touch pads utilise capacitive principles, for example as described in U.S. Pat. No. 5,305,017.

A typical pressure sensor utilises multiple layers of interdigitated conductive traces, with adjacent layers having traces perpendicular to the traces of a facing layer. When a pressure is applied the traces on opposing layers come into contact and hence form an electrically conductive pathway. U.S. Pat. No. 4,587,378 discloses an example of such a sensor in the context of a touch tablet. Measurement of a contact point in U.S. Pat. No. 4,587,378 is achieved by applying a reference voltage to one layer and measuring the output from the other layer.

According to a first aspect of the present invention, there is provided a contact sensor apparatus comprising: a first insulative layer; a second insulative layer; a first resistor strip on the first insulative layer; a second resistor strip on the second insulative layer; a plurality of first conductive traces provided on the first insulative layer and electrically connected to the first resistor strip; and a plurality of second conductive traces provided on the second insulative layer and electrically connected to the second resistor strip, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, wherein when a contact is applied there is an electrical contact between at least one of each of the plurality of first and second conductive traces in a region of the contact, and wherein when the contact is applied to the apparatus, the apparatus is operable to determine the dimensions of the contact as projected to the first and second resistor strips by measuring an electrical quantity across the first and second resistor strips.

With this arrangement a contact area may be measured by the effect it has on electrical properties of the resistor strip. The pressure applied by the contact will result in the traces of one layer shorting one or more traces of the other layer. This means that electrical properties measured at the resistor strip, such as the apparent resistance of the resistor strip, will be changed, since a portion of the resistor strip is shorted out due to the contact of the traces. In contrast to prior art systems such as that shown in U.S. Pat. No. 4,587,378 the measurement of the contact area may be achieved with separate measurements of the two resistor strips and without reference to the interaction between a voltage applied at one layer and an output of the second layer. There are simplifications in both the structural arrangement of the traces and in the electrical processing required to obtain a measurement of the contact area.

The contact area is defined by the points of intersection at which the applied contact causes an electrical contact between the plurality of first and second conductive traces. The contact sensor may measure the maximum dimensions of the contact area as projected to the respective resistor strips. In essence, the contact sensor measures the outline of the smallest possible orthogonal that encapsulates the whole contact area. This is explained in more detail below in relation to the preferred embodiment.

Preferably, the plurality of first and second conductive traces are electrically connected to the first and second resistor strips, respectively, to segment the respective strip into discrete, and preferably equal, resistor steps, $R_{step}$. Thus, $R_{step}$ is the resistance of the resistor strip between two adjacent conductive traces.

When a contact is applied to the contact sensor, the change in the resistance of the resistor strips will be a monotonic function, or more preferably a linear function, of the contact length and width as projected to the corresponding resistor strip. Here, the term "linear" is intended to be construed in a broad sense, and encompasses a substantially linear function, taking into account manufacturing tolerances of the resistors, etc.

As discussed above, when the contact is applied to the apparatus, the apparatus is operable to determine the dimensions of the contact as projected to the first and second resistor strips by measuring an electrical quantity across the first and second resistor strips. The apparatus may be further operable to compare the electrical quantity to the same electrical quantity measured when no contact is applied. Hence, the contact sensor apparatus may be arranged to determine a size of the contact area by determining the resistance along the length of the first and second resistor strips, which may be measured by applying a voltage (preferably using a constant voltage source) or current (preferably using a constant current source) and measuring the consequent current or voltage, respectively.

A constant current source includes any current source that can provide a known current value. The constant current source may be adjustable so that the output current value can be chosen (controlled), or may provide only one pre-set value.

If, instead of a constant current being applied to the resistor strip, a constant voltage were applied, the accuracy with which the dimensions of the contact area can be determined decreases. This is because, when there is a contact that shorts an area as opposed to a point, the current that will flow through the resistor strips will change. Therefore the voltage measured will be different. With a varying current, it is no longer possible to accurately calculate the value of the resistance, i.e. the dimensions of the contact area. This issue can be overcome as described below.

A constant voltage may be used to determine the length of the contact along each dimension. In such embodiments, a known value resistor is provided between the constant voltage source and the resistor strip. To calculate the length of a contact along one of the dimensions, a constant voltage is applied across the known resistor and the resistor strip. When part of this strip is shorted (when a contact is made), the resistance of the resistor strip will drop. This will increase the current the voltage source will need to supply to maintain the voltage. To measure the current, the voltage drop across the known resistor is measured. With a known resistance and measured voltage drop, the current can be determined. The total resistance (the sum of the resistance of the known value resistor and the resistor strip) and hence the resistance of the resistor strip can then be calculated. The difference in the resistance of the resistor strip before and after the contact will determine the size (along each dimension) of the contact.

Therefore, applying a constant current instead of a constant voltage simplifies the contact sensor because there is no need to provide the known value resistor between the constant voltage source and each resistor strip. However, both alternatives allow accurate calculation of the dimensions of the contact area.

As defined herein, the term "strip" should be taken to encompass any resistive structure that is able to achieve the affect of the invention. Thus, the shape and/or relative dimensions of the strip are not limited. In some embodiments, the strip is provided adjacent to an end of the conductive traces, such that the conductive traces extend away from the resistor strip. In alternative embodiments, the resistor strips extend along the length of the conductive traces, i.e. into the sensing area. The term "extends along the length of the conductive traces" encompasses embodiments where the resistor strip extends along the entire length of the conductive traces, and also embodiments where the resistor strip extends along only part of the entire length of the conductive traces. The term "strip" is intended to encompass the provision of a resistor "layer". In such embodiments, the conductive traces can be provided underneath or above the resistor strip (layer). It is preferred for the conductive traces are provided on top of the resistor strip (layer) so that the contact resistance is negligible.

As an alternative to a single continuous resistive layer, it is possible to use one or multiple resistor strips within the sensor area, or to use two or more resistor strips outside the sensing area adjacent to both ends of the conductive traces.

When the resistor strips are provided adjacent to the ends of the traces, a non-sensing border is formed. The advantage of providing a resistor strip (layer) or one or multiple resistor strips within the sensor area, rather than providing the resistor strips at the ends of the conductive traces is that it allows the creation of a borderless sensor, thereby maximizing the sensor area. An advantage of embodiments that utilize a resistive layer or more than one resistor strips (either within the sensor area, or outside it) is that the resistive steps are likely to have a more uniform resistance since the effect of localized imperfections in the manufacturing process of the resistor material will have less of an effect in the total resistance of the physically wider steps.

It is possible that through repeated use, mishandling, or a manufacturing defect, a conductive trace may be broken. If there are one or more breaks across a conductive trace, isolated conductive islands are formed in this trace. In a sensor with a resistor layer or multiple resistor strips each island can still be connected to the underlying continuous resistive layer or to an adjacent resistor strip. The greater the number of resistor strips, the greater the likelihood that a conductive island will be connected to at least one resistor strip. In the case of a sensor with a resistor layer, a large number of breaks along one or more conductive traces can be tolerated. This allows the sensor to function, even with multiple trace breaks. Such a sensor is therefore very robust and reliable.

In preferred embodiments, the apparatus is operable to determine a location of the contact along each dimension, wherein the apparatus is configured to:

a) apply a constant current across a resistor strip;

b) connect a high impedance voltage measuring circuit to the other resistor strip or corresponding conductive trace pattern; and c) measure the voltage drop over a part of the resistor strip extending from an end of the resistor strip to an edge of the contact to thereby determine the length of this part of the strip.

This length may be determined from the voltage drop based on the known current applied to the strip and the known resistance per unit length of the strip.

If, instead of a constant current being applied to the resistor strip, a constant voltage were applied, the accuracy with which the location of the contact area can be determined decreases. As noted above, this is because, when there is a contact that shorts an area as opposed to a point, the current that will flow through the resistor strips will change. Therefore the voltage measured will be different. With a varying current, it is no longer possible to accurately calculate the value of the resistance, i.e. the position of the contact area. This issue can be overcome as described below.

A constant voltage may be used to determine a location of the contact along each dimension. In such embodiments, a known value resistor is provided between the constant voltage source and the resistor strip. To calculate the location of a contact, a constant voltage is applied across the known resistor and the resistor strip. When part of this strip is shorted (when a contact is made), the resistance of the resistor strip will drop. This will increase the current the voltage source will need to supply to maintain the voltage. To measure the current, the voltage drop across the known resistor is measured. With a known resistance and measured voltage drop, the current can be determined. The total resistance (the sum of the resistance of the known value resistor and the resistor strip) and hence the resistance of the resistor strip can then be calculated. The difference in the resistance of the resistor strip before and after the contact will determine the size (along each dimension) of the contact. In addition, by measuring the voltage drop over part of the resistor strip extending from an end of the resistor strip to an edge of the contact, the length of this part of the strip can be determined. The length may be determined from the voltage drop based on the measured current applied to the strip and the known resistance per unit length of the strip.

Therefore, applying a constant current instead of a constant voltage simplifies the contact sensor because there is no need to provide the known value resistor between the constant voltage source and each resistor strip. However, both alternatives allow accurate calculation of the location of the contact area.

In some embodiments therefore, the apparatus is operable to determine a location of the contact along each dimension, wherein the apparatus may comprise: a constant voltage source; and a known-value resistor provided between the constant voltage source and the resistor strip; wherein the apparatus may be configured to: a) apply a constant voltage across the known-value resistor and the resistor strip; b) measure the voltage drop across the known-value resistor; c) determine the current through the known-value resistor and resistor strip from the measured voltage drop and known resistance of the known-value resistor; d) connect a high impedance voltage measuring circuit to the other resistor strip or corresponding conductive trace pattern; and e) measure the voltage drop over a part of the resistor strip extending from an end of the resistor strip to an edge of the contact to thereby determine the length of this part of the strip. This length may be determined from the voltage drop based on the measured current applied to the strip and the known resistance per unit length of the strip.

The contact sensor apparatus may comprise hardware and/or software for carrying out the above steps to determine the size and/or location of the contact area. For example the contact sensor apparatus may include a computer processor.

The contact sensor may be used to calculate the centre of a contact area since both the contact's dimensions and its position can be measured. The sensor is not affected by the uneven distribution of forces within the contact area, since it only measures contact, not force. Existing sensors that determine the centre of a contact area require an array of individually addressable force sensing elements; such sensors are complicated and require expensive interface electronics.

Preferably, each of the first and second resistor strips comprises a conductive connector connected to an electrical meter operable to make an electrical measurement to establish a size and/or a location of a contact. More preferably, each of the first and second resistor strips comprises a first and second end, and each of the first and second ends is connected by the conductive connectors to the electrical circuit. The conductive connector may connect each end of the first and second resistor strips to a voltage source, a constant current source, a ground or leave it floating.

The first and second insulative layers may be substrates defining two halves of the contact sensor.

Each of the first and second insulative layers may be formed from an electrically insulating material. Preferably, the first and second insulative layers are flexible, such that the contact sensor itself is flexible. The resistor strips and conductive traces should then also be flexible. The flexible layers may be layers manufactured by any suitable technique, such as conventional manufacturing techniques for manufacturing flexible circuits. Advantageously, the sensor may then conform to various different surfaces, for example in a non-planar configuration. In preferred embodiments, the layer to which a contact is applied is flexible. This allows the layer to which the contact is applied to conform to the shape of the contact. The flexible layer may can be made of paper, fabric, plastic, etc. In embodiments including a rigid layer, the substrate may be made of plastic, wood, ceramic such as alumina, glass, an insulated metallic sheet, or other suitable alternatives. The flexible layers and flexible conductive elements may be manufactured using conventional techniques for production of flexible circuitry.

Preferably, the sensor is very thin (under 0.3 mm) and can be made thinner (under 0.1 mm) if the application requires it.

In some preferred embodiments the contact sensor is transparent. In this case, the first and second insulative layers are preferably plastic (and may also be flexible). Preferably, the conductive traces are provided as thin ITO films (although these are fragile), PEDOT/PSS conductive traces, or nano-conductors (the traces can be so thin or narrow that they are nearly invisible).

In some other embodiments the contact sensor is opaque. In this case, at least one of the first and second insulative layers is opaque. A transparent or opaque contact sensor can be placed underneath and in contact with a flexible display as opposed to on the top of the flexible display; the sensor can detect the point or area of touch over the flexible screen. This approach allows the use of this sensor with a display without compromising the clarity or brightness of the display.

If the object that contacts the sensor is very rigid, e.g. metallic plate, it may be difficult for the sensor to register the contact area and location with accuracy because the rigid applicator will not conform to bring the sensor layers together. In sensor applications where this is expected to occur, a soft, compliant layer may cover the sensor surface; this layer will help transfer the hard object's footprint to the sensor.

Preferably, the first and second layers are resiliently spaced apart. When a contact is applied, the plurality of conductive traces on the layer to which a contact is applied are pushed towards the plurality of conductive traces on the other layer, to form conductive pathways therebetween in the region of the contact. When the contact is removed, the layers spring apart such that there is no longer any contact between any of the plurality of first and second conductive traces on the first and second insulative layers.

The resilient spacing may be achieved by providing a spacer layer between the first and second layers. In exemplary embodiments, this spacer layer may be provided as a pattern of spacer dots, or as a grid. Other patterns or arrangements are also possible, for example, the resilient spacing can be obtained by creating embossed domes on the substrate itself.

One problem which may occur when the spacer layer is provided as a pattern of spacer dots is that the spacer dots may each act almost like a tent pole, causing local deformation of the upper layer which is supported on the spacer dots. Over time, this deformation becomes more and more pronounced as pressure is repeatedly applied, and may become permanent. This may result in the two layers sticking together, causing electrical contact between the layers even in the absence of an applied contact. This is particularly problematic in the context of use in a foot measuring device, as the force applied by the foot can be very high.

In principle, the smaller the height of the spacer pattern, the less pronounced the "tent" effect will be. Also, using a denser array of dots aids keeping the two sensor halves separate in the absence of an applied contact. However, the denser the array, the greater the force needed to bring the two layers together. Additionally, the denser the array, the greater the probability that the end of the contact will fall over a spacer dot. This degrades the accuracy of the measurements since each spacer dot prevents contact between the conductive traces at that point.

One solution to this problem is to include an additional spacer layer separate from, and to be used in combination with, the pattern of spacer dots. The additional spacer layer provides a more rugged sensor. The additional spacer layer may be a printed grid, or a grid cut from sheet or film material.

Thus, the spacing structure may comprise a series of electrically insulative dots and an electrically insulative grid.

Features of the spacer structure may affect the threshold of the force needed to make the plurality of first and second conductive traces on the two layers contact each other. The tighter the spacer pattern and the greater its height, the greater the force needed to register a contact at the points of intersection of the plurality of first and second conductive traces. To keep the two layers separated, the spacer pattern may be thicker than the thickness of the conductive traces.

The spacer pattern may be printed on and/or off the conductive traces. Preferably, the spacer pattern should not cover the conductive traces because a poor registration of that layer during manufacturing could position the spacers where points of intersection occur, which may degrade the sensor's resolution.

The spacer structure may comprise a resistive layer printed over the conductive traces. It is preferred that such a resistive spacer layer conducts in the thickness direction only (when a pressure is applied by a contact on the sensor surface), i.e. it is an anisotropically resistive layer. The advantage of providing a continuous resistive spacer layer is that, when manufacturing the contact sensor, there will be no concerns regarding the registration tolerances when the continuous resistive spacer layer is deposited. This is especially useful when the sensor's resolution is very high since printing a spacer pattern without shorting the conductive traces can be very challenging, which will affect manufacturing yields.

It may be required that the spacer pattern is transparent. In this case, flexible transparent non-conductive resins can be used such as phenoxy, silicone resins, or solid spacers such as a grid made out of a thin plastic sheet etc.

An adhesive may be needed to keep the two insulative layers together. This adhesive can be applied around the sensing area or around the perimeter of the insulative layers. In addition, it can be applied within the sensing area as long as it does not cover the points of intersection of the conductive traces. The adhesive may be patterned in a way that allows any trapped air between the sheets to escape to areas outside the contact area or outside the contact sensor altogether.

Most common screen printable adhesives, double sided tapes or flexible glue are adequate for securing the two sensor layers together.

Preferably, the plurality of first and second conductive traces extend away from the first and second resistor strip, respectively, at an angle of at least 10°, more preferably at least 45°. In some embodiments, the plurality of first and second conductive traces extend orthogonally from the resistor strip.

The plurality of first conductive traces may be spaced regularly along the first resistor strip by a first spacing, and the plurality of second conductive traces may be spaced regularly along the second resistor strip by a second spacing. In some embodiments, the first and second spacings are equal. However, embodiments where the first and second spacings are different are also possible. In such embodiments, the resolution in each direction may be different.

The angle of one set of conductive traces against the other can vary from 0° to 180°. The angle is determined by the two primary dimensions of the contact area that need to be measured. The first and second conductive traces preferably cross each other at an angle of at least 45°, but most preferably the angle is 90°.

The first and second resistor strips may have equal resistance per length and/or per step. In other embodiments, the first and second resistor strips may have different resistances. This can be achieved by having the first and second plurality of conductive traces with a different pitch, by printing a wider resistor strip, by providing resistance strips of different materials with a different resistivity $\rho$, and so on. Preferably, the resistance of the first and second resistor strips and/or the size of the spacing between adjacent conductive traces is set so that the resistance of each step of the resistor strip across the spacing between adjacent conductive traces is at least two times greater than the resistance of the conductive traces, preferably at least five times greater, more preferably at least ten times greater. The resistance of each step of the resistor strip across the spacing between adjacent conductive traces may be between two and ten times greater than the resistance of the conductive traces, preferably at least five times greater. The resistance of each step of the resistor strip across the spacing between adjacent conductive traces is not particularly limited, and may range from the order of milli-Ohms to hundreds of kilo-Ohms. In one example, the resistance of each step of the resistor strip is in the range of 30 to 60 $\Omega$. In other examples, the resistance is in the range of 50 to 100 or 300 to 600 $\Omega$.

Preferably, the higher the resolution of the sensor is (for example in cases with a smaller spacing between the conductive traces), the greater the resistance of the resistor strip is, per unit length. This can be achieved by manufacturing a thinner strip (in width and/or thickness) and/or by using a material with a larger resistivity $\rho$.

The sensor can be trimmed around at least part of its periphery to create a sensing area with a custom footprint.

The resistor strips do not necessarily need to extend across the whole spacing of the conductive traces. A separate resistor strip or array of resistor steps can occupy a smaller area or be located at a distance from the location of the conductive traces as long as the plurality of conductive traces is routed to that resistor strip to create discrete, and preferably equal, resistor steps.

The shape of the conductive traces can deviate from that of a straight line, e.g. it can be semicircular, zigzag, wavy, etc. Likewise, the resistor strips do not have to be a straight line; they can be wavy, semicircular etc. as long as they can be divided by the conductive traces into discrete resistor steps, preferably of equal value.

Preferably the resistance of the first and second resistor strips is constant per unit length.

Different manufacturing methods can be used to provide the resistor strips and conductive traces. Some non-limiting examples are: screen printing; smart fabrics; flexible printed circuitry; and thin film deposition on thin, flexible silicon wafers.

Preferably, the conductive traces have a low resistance, and so can be provided as silver or copper tracks, for example.

Advantages of the present invention can also be achieved by replacing one half of the sensor with a conductive layer. When a contact is applied, this layer will short the conductive traces on the other half and thus allow the measurement of a contact in one dimension only. A suitable application is the measurement of the nip width between rollers.

Thus, according to a second aspect of the invention, there is provided a contact sensor apparatus comprising: a first insulative layer; a second insulative layer; a resistor strip on the first insulative layer; a plurality of conductive traces provided on the first insulative layer and electrically connected to the resistor strip; and a conductive layer provided on the second insulative layer, wherein the first insulative layer and second insulative layer face each other such that the plurality of conductive traces face the conductive layer, wherein the first insulative layer and second insulative layer are spaced apart such that there is no electrical contact between the plurality of conductive traces and the conductive layer when a contact is not applied to the contact sensor, and wherein when a contact is applied there is an electrical contact between at least one of each of the plurality of conductive traces and the conductive layer.

In one embodiment, the conductive layer is a continuous conductive layer (for example, a metal foil).

Thus, there is also disclosed herein a contact sensor apparatus, the sensor comprising: a first insulative layer; a second insulative layer; a resistor strip on the first insulative layer; a plurality of conductive traces provided on the first insulative layer and electrically connected to the resistor strip; and a continuous conductive layer provided on the second insulative layer, wherein the first insulative layer and second insulative layer face each other such that the plurality of conductive traces face the continuous conductive layer, wherein the first insulative layer and second insulative layer are spaced apart such that there is no electrical contact between the plurality of conductive traces and the continuous conductive layer when a contact is not applied to the contact sensor, and wherein when a contact is applied there is an electrical contact between at least one of each of the plurality of conductive traces and the continuously conductive layer.

Providing a continuous conductive layer (which may for example be made of silver) can be expensive and/or may limit the sensor's transparency. An alternative is to provide instead a layer having tightly spaced conductive traces connected at one side by a conductive bar. This is very similar to the configuration of the sensor of the first aspect of the present invention, except that the second resistor strip is replaced by a conductive bar, the resistance of which is not crucial to the operation of the sensor. Alternatively, the conductive bar that connects the conductive traces can be within the sensing area. If only the area of the contact needs to be determined then the conductive bar can be omitted. If all the conductive traces are connected by the conductive bar, then the position of the contact can also be determined.

In further alternative, the parallel conductive lines could be replaced by a mesh/grid-like pattern.

Where applicable, the above-identified preferable features of the first aspect of the present invention can also be applied to the second aspect of the present invention.

For example, when the contact is applied to the apparatus of the second aspect of the present invention, the apparatus is preferably operable to determine the dimensions of the contact as projected to the resistor strip by measuring an electrical quantity across the resistor strip. The apparatus may be further operable to compare the electrical quantity to the same electrical quantity measured when no contact is applied. In preferred embodiments, the electrical quantity is resistance or voltage. The apparatus may be further operable to determine a location of the contact along one dimension, wherein the apparatus is configured to measure the resistance between the continuous conductive layer and an end of the resistor strip to thereby determine a distance of the contact area from the end of the resistor strip.

In some embodiments, the strip is provided adjacent to an end of the conductive traces, such that the conductive traces extend away from the resistor strip. In alternative embodiments, the resistor strip extends along the length of the conductive traces, i.e. into the sensing area. The term "extends along the length of the conductive traces" encompasses embodiments where the resistor strip extends along the entire length of the conductive traces, and also embodiments where the resistor strip extends along only part of the entire length of the conductive traces. The term "strip" is intended to encompass the provision of a resistor "layer". In such embodiments, the conductive traces can be provided underneath or above the resistor strip (layer). It is preferred for the conductive traces are provided on top of the resistor strip (layer) so that the contact resistance is negligible.

The resistor strip may comprise a conductive connector connected to an electrical meter operable to make an electrical measurement to establish a size and/or a location of a contact. Preferably, the resistor strip comprises a first and second end, and each of the first and second ends may be connected by the conductive connector to the electrical meter or to a voltage source, a current source or ground or floating.

Preferably, the resistance of each of the plurality of conductive traces is less than the resistance of each step of the resistor strip across the spacing between adjacent conductive traces; more preferably the resistance of each of the plurality of conductive traces is at least two times less than the resistance of each step of the resistor strip across the spacing between adjacent conductive traces; and most preferably, the resistance of each of the plurality of conductive traces is at least five times less than the resistance of each step of the resistor strip across the spacing between adjacent conductive traces.

The plurality of conductive traces may be spaced regularly along the resistor strip.

In preferred embodiments, the first insulative layer and second insulative layer are resiliently spaced apart, preferably by a spacing structure between the first and second insulative layers. The spacing structure may be a series of electrically insulative dots, or an electrically insulative grid, or may be a resistive layer. Alternatively, the spacing structure may comprise a series of electrically insulative dots and an electrically insulative grid.

Preferably, the contact sensor is flexible, and/or is transparent.

A third aspect of the present invention provides a method for determining a size of a contact applied to the apparatus of the first aspect or any of the preferred embodiments thereof described above, the method comprising, when the contact is applied to the apparatus, determining the dimensions of the contact as projected to the first and second resistor strips by measuring an electrical quantity across the first and second resistor strips. Preferably, the method comprises comparing the electrical quantity to the same electrical quantity measured when no contact is applied. In preferred embodiments, the electrical quantity is resistance or voltage. It is however also possible to utilise current, which can be measured by application of a constant voltage to the resistor strip, adding a known value resistor between the voltage and the strip and measuring the voltage drop across the resistor.

In preferred embodiments, the method further comprises determining a location of the contact along each dimension. For each dimension, the location is determined by:

a) applying a constant current across a resistor strip;

b) connecting a high impedance voltage measuring circuit to the other resistor strip or corresponding conductive trace pattern;

c) measuring the voltage drop over a part of the resistor strip extending from an end of the resistor strip to an nearest edge of the contact to thereby determine the length of this part of the strip.

Alternatively, the method may further comprise determining a location of the contact along each dimension, wherein for each dimension, the location may be determined by: a) applying a constant voltage across a resistor strip and a known-value resistor, the known value resistor being provided between a constant voltage source and the resistor strip; b) measuring the voltage drop across the known-value resistor; c) determining the current through the known-value resistor and resistor strip from the measured voltage drop and known resistance of the known-value resistor; d) connecting a high impedance voltage measuring circuit to the other resistor strip or corresponding conductive trace pattern; and e) measuring the voltage drop over a part of the resistor strip extending from an end of the resistor strip to an edge of the contact to thereby determine the length of this part of the strip. This length may be determined from the voltage drop based on the measured current applied to the strip and the known resistance per unit length of the strip.

A fourth aspect of the present invention provides a method for determining a size of a contact applied to the apparatus of the second aspect or any of the preferred embodiments thereof described above, the method comprising, when the contact is applied to the apparatus, determining the dimension of the contact as projected to the resistor strip by measuring an electrical quantity across the resistor strip. Preferably, the method further comprises comparing the electrical quantity to the same electrical quantity when no contact is applied. In preferred embodiments, the electrical quantity is impedance or voltage. Optionally, the method may further comprise determining a location of the contact along the dimension of the resistor strip, wherein the location is determined by measuring the resistance between the continuous conductive layer and an end of the resistor strip to thereby determine a distance of the contact area from the end of the resistor strip.

According to a fifth aspect of the present invention, there is provided a method for manufacturing a contact sensor according to the first aspect of the present invention. The method comprises: providing a first insulative layer; providing a second insulative layer; providing a first resistor strip on the first insulative layer; providing a second resistor strip on the second insulative layer; providing a plurality of first conductive traces on the first insulative layer to be electrically connected to the first resistor strip; and providing a plurality of second conductive traces on the second insulative layer to be electrically connected to the second resistor strip, wherein the first insulative layer and second insulative layer are arranged to face each other such that the plurality of first conductive traces face the plurality of second conductive traces with each of the first conductive traces extending across the plurality of second conductive traces and each of the second conductive traces extending across the plurality of first conductive traces, thereby forming an array of points of intersection of the first and second conductive traces, wherein the first insulative layer and second insulative layer are spaced apart such that there is no electrical contact between the plurality of first and second conductive traces when a contact is not applied to the contact sensor, wherein when a contact is applied there is an electrical contact between at least one of each of the plurality of first and second conductive traces in a region of the contact, and wherein when the contact is applied to the apparatus, the apparatus determines the dimensions of the contact as projected to the first and second resistor strips by measuring an electrical quantity across the first and second resistor strips.

According to a sixth aspect of the present invention, there is provided a method for manufacturing a contact sensor according to the second aspect of the present invention. The method comprises: providing a first insulative layer; providing a second insulative layer; providing a resistor strip on the first insulative layer; providing a plurality of conductive traces on the first insulative layer to be electrically connected to the resistor strip; and providing a continuous conductive layer on the second insulative layer, wherein the first insulative layer and second insulative layer are arranged to face each other such that the plurality of conductive traces face the continuous conductive layer, wherein the first insulative layer and second insulative layer are spaced apart such that there is no electrical contact between the plurality of conductive traces and the continuously conductive layer when a contact is not applied to the contact sensor, and wherein when a contact is applied there is an electrical contact between at least one of the plurality of conductive traces and the continuous conductive layer in a region of the contact.

More generally, according to a seventh aspect of the present invention, there is provided a contact sensor apparatus comprising: a first insulative layer; a second insulative layer; a first resistor strip on the first insulative layer; a second resistor strip on the second insulative layer; a plurality of first conductive traces provided on the first insulative layer and electrically connected to the first resistor strip; and a plurality of second conductive traces provided on the second insulative layer and electrically connected to the second resistor strip, wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces, wherein the first insulative layer and second insulative layer are spaced apart such that there is no electrical contact between the plurality of first and second conductive traces when a contact is not applied to the contact sensor, wherein when a contact is applied there is an electrical contact between at least one of each of the plurality of first and second conductive traces in a region of the contact.

Preferably, when the contact is applied to the apparatus, the apparatus is operable to determine the dimensions of the contact as projected to the first and second resistor strips by measuring an electrical quantity across the first and second resistor strips.

The above-identified preferable features of the first aspect of the present invention can also be applied to the seventh aspect of the present invention.

The third aspect of the invention (which provides a method for determining a size of a contact applied to the apparatus of the first aspect or any of the preferred embodiments thereof), and preferred features thereof, are equally applicable to the seventh aspect (in place of the first aspect).

Correspondingly, according to an eighth aspect of the present invention, there is provided a method for manufacturing a contact sensor according to the seventh aspect of the present invention. The method comprises: providing a first insulative layer; providing a second insulative layer; providing a first resistor strip on the first insulative layer; providing a second resistor strip on the second insulative layer; providing a plurality of first conductive traces on the first insulative layer to be electrically connected to the first resistor strip; and providing a plurality of second conductive traces on the second insulative layer to be electrically connected to the second resistor strip, wherein the first insulative layer and second insulative layer are arranged to face each other such that the plurality of first conductive traces face the plurality of second conductive traces with each of the first conductive traces extending across the plurality of second conductive traces and each of the second conductive traces extending across the plurality of first conductive traces, thereby forming an array of points of intersection of the first and second conductive traces, wherein the first insulative layer and second insulative layer are spaced apart such that there is no electrical contact between the plurality of first and second conductive traces when a contact is not applied to the contact sensor, wherein when a contact is applied there is an electrical contact between at least one of each of the plurality of first and second conductive traces in a region of the contact.

Preferably, when the contact is applied to the apparatus, the apparatus determines the dimensions of the contact as projected to the first and second resistor strips by measuring an electrical quantity across the first and second resistor strips.

The present invention has numerous applications. Some non-limiting examples are: touch-screens; foot measuring devices; dancing mats for video games; flexible keyboards; sliders for instrument panels, customizable keypads, car seat occupancy sensors; locating the position of a vulnerable person (e.g. an elderly person) in his/her home, where the sensor is integrated with the floor to detect footprints and other smart objects, with the touch/contact sensor embedded therein.

Certain preferred embodiments will now be described in greater detail by way of example only and with reference to the following drawings in which:

FIG. 1 is a schematic exploded perspective view of a contact sensor;

FIG. 3 is a diagram illustrating a design for a contact sensor;

FIG. 5 is a diagram of an alternative arrangement wherein the contact sensor has a polar structure;

FIG. 6a shows a possible spacer layer;

FIGS. 6b to 6e show additional spacer layers for use in combination with an array of spacer dots;

FIG. 13 shows the equivalent circuit for the sensor of FIG. 8 when a small contact is applied that only shorts one resistance step along one of the resistor strips;

FIG. 14 shows the equivalent circuit for the sensor of FIG. 8 when a contact is applied that shorts one resistance step along one of the resistor strips, and one resistance step along the other resistor strip;

FIG. 16 shows measurement of the contact length and position in the other dimension for the sensor of FIG. 8;

Figure 2A:
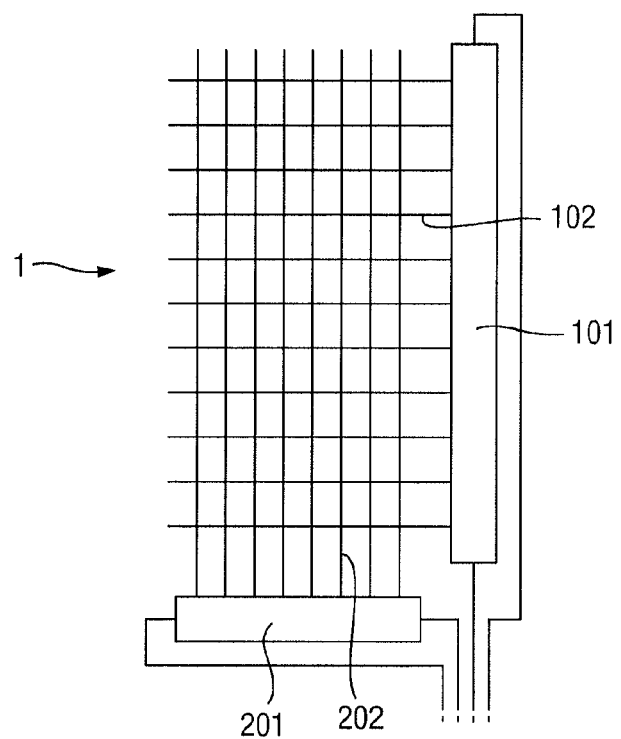
FIG. 2a is a schematic plan view of the contact sensor.

With reference to FIG. 1, the contact sensor 1 comprises two electrically insulative layers (substrates). In particular, the contact sensor comprises a first layer 100 and a second layer 200. Each layer 100, 200 carries an array of parallel (or nearly parallel) conductive traces 102, 202, which extend across the layer 100, 200 away from a respective resistor strip 101, 201. The conductive traces 102, 202 divide the resistor strips 101, 201 into equally sized resistor steps, $R_{step}$ (see FIG. 2b). Thus, $R_{step}$ is the resistance of the resistor strip between two adjacent conductive traces.

Figure 2B:
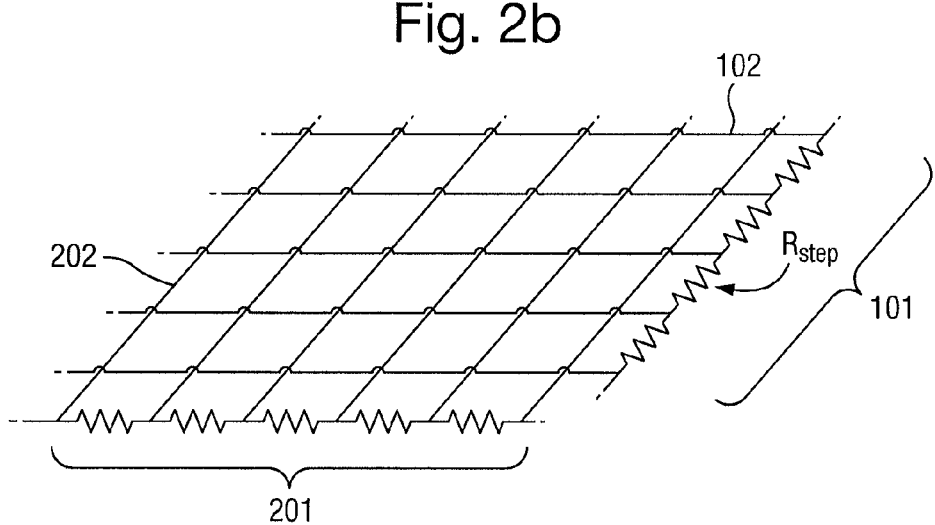
FIG. 2b shows an equivalent electrical circuit of the contact sensor.

As shown in FIG. 2a, the two layers are assembled together so that the conductive traces 102 on the first layer 100 face the conductive traces 202 on the second layer 200, and the conductive traces on one layer are at an angle to the conductive traces on the other layer. In this preferred embodiment the two sets of traces 102, 202 are orthogonal, although this is not essential. The conductive traces 102, 202 on both layers therefore form an array, or grid, of points of intersection, which forms the sensing area. The equivalent electrical circuit is shown in FIG. 2b.

Figure 4:
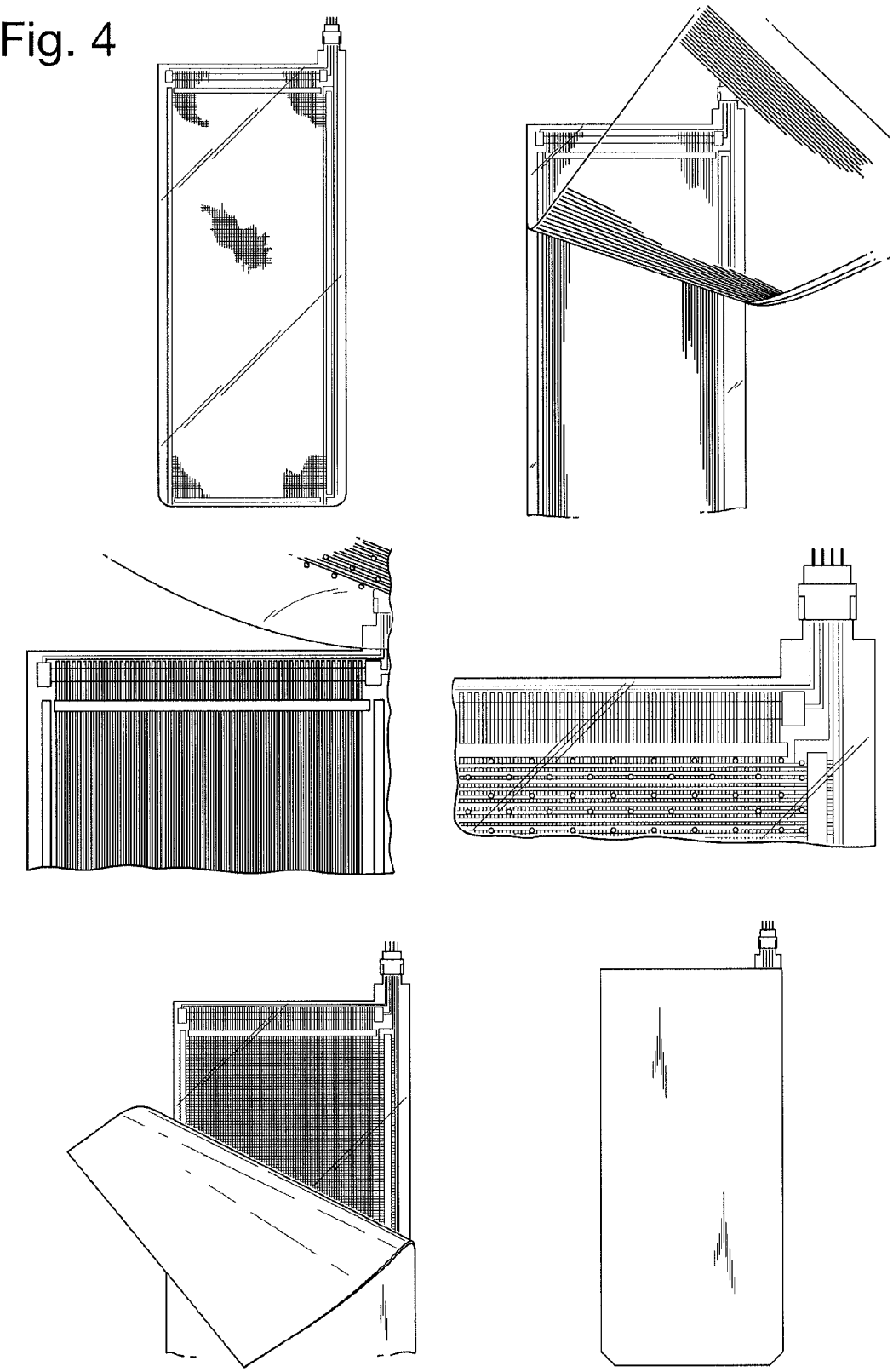
FIG. 4 shows an embodiment of a contact sensor in various views.

An example of a real-world implementation of the sensor design is shown in FIGS. 3 and 4. This embodiment is a sensor with a large number of traces covering a large area. Other embodiments (for example those shown in FIGS. 1 and 8) which are provided to aid the explanation of how the sensor functions have been simplified.

It is not necessary for both layers 100, 200 to be flexible, although it is preferred since this allows for a fully flexible sensor. Only the layer to which the contact 300 is applied must be able to conform so that it can transfer the contact area to the embedded conductive traces 102, 202. Therefore, the sensor can comprise one rigid layer and one flexible layer. The flexible layer can be made of paper, fabric, plastic, etc. whereas the rigid substrate can be made of plastic, wood, ceramic such as alumina, glass, an insulated metallic sheet, etc. In the embodiment shown in FIG. 4, the layers comprised a polyester substrate 100 μm thick (PMX729 from HiFi Industrial Film, UK).

If the object that contacts the sensor is very rigid, e.g. metallic plate, it may be difficult for the sensor to register the contact area 301 and location with accuracy because the rigid applicator will not conform to bring the sensor layers together. In sensor applications where this is expected to occur, either the contact force needs to be increased or a soft, compliant layer can cover the sensor surface; this layer will help transfer the hard object's footprint to the sensor. In an alternative arrangement the substrate carrying the circuit can be made thicker and more compliant, for example by means of a silicone skin.

Different manufacturing methods can be used to provide the resistor strips 101, 201 and conductive traces 102, 202 on the layers 100, 200. Some of these methods are:
- screen printing—compatible with roll-to-roll printing, which is a common large scale manufacturing process for flexible displays;
- smart fabrics—conductors and resistors are made of conductive and resistive yarns;
- flexible printed circuitry—the resistor strip may comprise a linear array of serially connected discrete passive resistors, e.g. in a Surface Mount Device (SMD) package —this approach can guarantee a certain level of step uniformity by selecting resistors with the appropriate tolerance; and
- thin film deposition on thin, flexible silicon wafers.

The conductive traces 102, 202 have a low resistance, and so can be provided as silver or copper tracks, for example, which may be created by means of silver filled polymer thick film inks, which are screen printable.

In the embodiment of FIG. 4, a resistive polymer thick film ink (Acheson Electrodag 965SS) was used to print the resistor strips 101, 201. The ink was cured at 140° C. for 30 min.

It may be desirable that the conductive traces be transparent. In that case, thin ITO films (although these are fragile), PEDOT/PSS conductive traces, or nano-conductors (the traces can be so thin that they are nearly invisible) can be used. In the embodiment of FIG. 4, the conductive traces were printed using a silver filled resin (Acheson Electrodag 725-A), which was cured at 120° C. for 30 min.

The angle of one set of conductive traces against the other can vary from 0° to 180°. The angle is determined by the two primary dimensions of the contact area 301 that need to be measured.

The sensor can be trimmed around at least part of its periphery to create a sensing area with a custom footprint as long as the conductive traces 102, 202 to the resistor strips 101, 201 are not cut (resistive mode). The sensor can still function in the wiper mode (to be discussed later) even if one of the conductive traces to the resistor strips is cut.

The resistor strips 101, 201 do not necessarily need to extend across the whole length of the area covered by the conductive traces 102, 202, and neither do they need to be at 90° to the conductive traces. A separate resistor strip 101, 201 or array of resistor steps can occupy a smaller area or be located at a distance from the location of the conductive traces as long as the set of conductive traces is routed to that resistor strip to create discrete, preferably equally sized, resistor steps.

Also the resistor steps can have a different value on the different resistor strips 101, 201. This can be achieved by having conductive trace sets 102, 202 with a different pitch, or by printing a wider resistor strip, etc. For simplicity, this disclosure will assume that the value of the resistance steps on each resistor strip is the same, unless otherwise noted.

The accuracy of the sensor is affected by the evenness of the resistor strip. If the resistor strip is not uniform, there will be a need for calibration. In general, an $R_{step}$ to $R_{step}$ variation of up to 20% should be acceptable, although it is preferred that the variation is around 5% or less. Assuming the variation across the resistor strip is random, when a contact 300 is made the variations of the un-shorted resistor steps $R_{step}$ will cancel each other out and the measured resistance can still be accurate.

The centre-to-centre spacing between the conductive traces in each direction defines the measuring resolution in each direction, e.g. for 1 mm wide traces with 1 mm spacing between them, the measuring resolution is 2 mm, which results in a contact measurement accuracy of ±1 mm.

The resolution can be different in each direction but most applications would benefit from having the same resolution in both directions.

In addition, the gap between the conductive traces affects the minimum resistor step $R_{step}$; the smaller the gap, the smaller the $R_{step}$. Given that the measuring circuitry must have a resolution of at least $R_{step}$ (assuming the parasitic resistances are negligible) to be able to detect the minimum change, the smaller the $R_{step}$, the more demanding the specs for the circuitry become. Therefore, the higher the resolution is (tighter spacing between the conductive traces), the greater the resistance of the resistor strip should be. This can be achieved by manufacturing a thinner strip (in width and/or thickness) and/or by using a material with a larger resistivity $\rho$.

The minimum spacing that can be achieved between the conductive traces depends on the capabilities of the manufacturing technology, e.g. with conventional screen printing, 200 μm is achievable. In smart fabrics, the gap between conductive threads will probably have to be at least 0.5 mm to make sure the threads are electrically isolated from each other. With photolithographic methods, the spacing can be less than 100 μm.

The shape of the conductive traces can deviate from that of a straight line, e.g. it can be semicircular, zigzag, wavy, etc. Likewise, the resistor strips do not have to be a straight line; they can be wavy, semicircular etc. as long as they can be divided by the crossing conductive traces into resistor steps of discrete, nominally equal, value.

In the case of the zigzag conductive traces the benefit is that the effective width of the conductive traces is greater without printing a solid pattern of the same width. Given the high cost of conductive materials, such as silver ink, this approach can result in a significant cost saving. In one embodiment (see FIG. 5), an array of homocentric arc shaped conductive traces 202 on one layer and an array of non-parallel radial conductive traces 102 on the other layer could be used to detect the contact position in polar coordinates, i.e. distance from the virtual centre and angle from a fixed direction. This polar sensor can also detect the contact area 301 in units of trace sectors.

As shown in FIGS. 1 and 3, in order to resiliently space apart the first and second layers 100, 200, a spacer structure 103, in this case spacer dots, can be provided on one or both layers between or on the conductive traces 102, 202. The spacer structure 103 (e.g. spacer dots) helps the first and second plurality of conducive traces 102, 202 remain electrically isolated from each other when no contact is applied to the sensor. It is also possible to provide the spacer structure 103 as lines or a pattern around the conductive traces. Features of the spacer structure 103 will affect the threshold of the force needed to make the two layers contact each other. The tighter the spacer pattern 103 and the greater its height, the greater the force needed to register a contact at the points of intersection of the first and second conductive traces. Of course, to keep the two layers 100, 200 separated, the spacer pattern 103 has to be thicker than the depth of the conductive traces 102, 202.

The spacer pattern 103 can be printed on and/or off the conductive traces 102, 202. It is nonetheless better not to cover the conductive traces because a poor registration of that layer during manufacturing could position the spacer structure where points of intersection occur, which will degrade the sensor's resolution.

In the embodiment of FIG. 4, the spacer layer 103 was formed by transferring a grid of 1 mm diameter dots spaced every 10 mm on the conductive trace area. The dots were cut out of a sign vinyl film (80 µm thick) using a digitally controlled cutter. An application tape was then used to transfer the cut dots on the conductive trace area on one of the sensor layers.

An alternative spacer layer 103 was cut out of the vinyl film in the shape of an orthogonal grid (as in FIG. 6) with a line thickness of 0.5 mm and a grid square of 20 mm×20 mm. This grid was placed in between the two insulative layers 100, 200. This pattern is quicker to cut because the overall cut length is shorter than the cut length needed to cut hundreds of dots.

When the spacer layer is provided as a pattern of spacer dots, the spacer dots may each act almost like a tent pole, causing local deformation of the upper layer which is supported on the spacer dots. Over time, this deformation becomes more and more pronounced as pressure is repeatedly applied, and may become permanent. This may result in the two layers sticking together, causing electrical contact between the layers even in the absence of an applied contact. One solution to this problem is to include an additional spacer layer separate from, and to be used in combination with, the pattern of spacer dots.

FIG. 6b shows an additional spacer layer 103 provided by two intersecting lines crossing the sensor area from side to side (i.e. two lines bisecting the sensor area). The lines are, for example, 0.5 mm wide and 100 µm thick. When the sensor is used as a foot measuring device, using such a layer ensures that the spacer lines are normally outside the ends of the contact area of the foot. This means that the sensor's accuracy is not affected. This is therefore the most preferred configuration for an additional spacer layer when the sensor is used as a foot measuring device.

FIG. 6c shows an additional spacer layer 103 provided by two intersecting lines crossing the sensor area from corner to corner (i.e. two diagonal lines). The disadvantage of such a configuration, when used in a foot measuring device, is that the heel of the foot falls in the bottom triangle, and as such is fully unsupported by the additional spacer. This can lead to the permanent sticking of the layers.

FIG. 6d shows another configuration of the additional spacer layer 103. The additional spacer layer is provided by a first plurality of parallel lines crossing the sensor from side to side. The lines are skewed (i.e. not parallel to the sides of the sensor) so that, when used in a foot measuring device, the widest part of the foot can never be aligned exactly with any spacer line. Such an additional spacer layer provides additional ruggedness at the expense of accuracy of determining the contact location/area.

FIG. 6e shows another configuration of the additional spacer layer 103 which is similar to the one shown in FIG. 6d but includes a second plurality of skewed lines crossing the sensor from side to side and intersecting with the first plurality of lines. Such a pattern adds extra ruggedness compared to the configuration of FIG. 6d, but further degrades the sensor accuracy.

Another alternative means of creating a spacer structure 103 is to print a resistive layer over the conductive traces. This spacer will only affect $R_{contact}$, which is the contact resistance between the conductive traces at each point of intersection. Therefore, the selection of the resistive layer needs to take into account the desired threshold and the effect on the sensor's accuracy due to the effects of $R_{contact}$. Ideally, $R_{contact}$ needs to have a switch-like behaviour, i.e. when the force threshold is exceeded, $R_{contact}=0$, whereas for forces under the threshold, $R_{contact}=\infty$. In practice, $R_{contact}$ can be about 10× and preferably 100× and most preferably 1000× greater than $R_{step}$ for forces under the threshold and about ½ of $R_{step}$ and preferably ⅕ and most preferably ¹⁄₁₀ for forces over or equal to the threshold.

Although a resistive spacer layer 103 could be a continuous layer that covers both the conductive traces 102, 202 and the spacing in between, this would short adjacent conductive traces and affect the resistance measured across the resistor strips 101, 201. The resistance between neighbouring conductive traces must be very high, at least 10× that of $R_{step}$ to reduce the effect. Nonetheless, given that the spacing between the conductive traces 102, 202 creates very short and wide planar resistor steps, the resistivity of the resistive spacer layer will have to be much higher than that of the resistor strip. This can make $R_{contact}$ too great, which will severely degrade the sensor's accuracy. It is therefore preferred that such a resistive spacer layer conducts in the Z (thickness) direction only, i.e. it is an anisotropically resistive layer. The advantage of providing a continuous resistive spacer layer 103 is that, when manufacturing the contact sensor 1, there will be no concerns regarding the registration tolerances when the continuous resistive spacer layer is deposited. This is especially useful when the sensor's resolution is very high since printing a spacer pattern without shorting the conductive traces 102, 202 can be very challenging, which will affect manufacturing yields.

The spacer structure 103 can be transparent, so that the sensor can be overlaid onto a visible background. In this case, flexible transparent non-conductive resins can be used such as phenoxy, silicone resins, or solid spacers such as a grid made out of a thin plastic sheet etc.

An adhesive may be needed to keep the two insulative layers 100, 200 together. This adhesive can be applied around the sensing area or around the perimeter of the insulative layers. In addition, it can be applied within the sensing area as long as it does not cover the points of intersection of the conductive traces 102, 202. The spacer dots could be replaced by adhesive dots so that both functions are satisfied by a single layer. The adhesive should be patterned in a way that allows any trapped air between the sheets to escape to areas outside the contact area 301 or outside the contact sensor 1 altogether.

Most common screen printable adhesives, double sided tapes or flexible glue are adequate for securing the two insulative layers 100, 200 together.

The two ends of each of the resistor strips 101, 201 are connected to electrodes 110, 120 and 210, 220 respectively. The electrodes are provided for connection to an electronic circuit. In the embodiment of FIG. 4, the ends of the resistor strips 101, 201 were terminated to silver electrodes, which were then routed to a flexible printed circuit (FPC) connector. The connector was attached to the digital instruments or custom circuit boards that read the sensor output.

Figure 7:
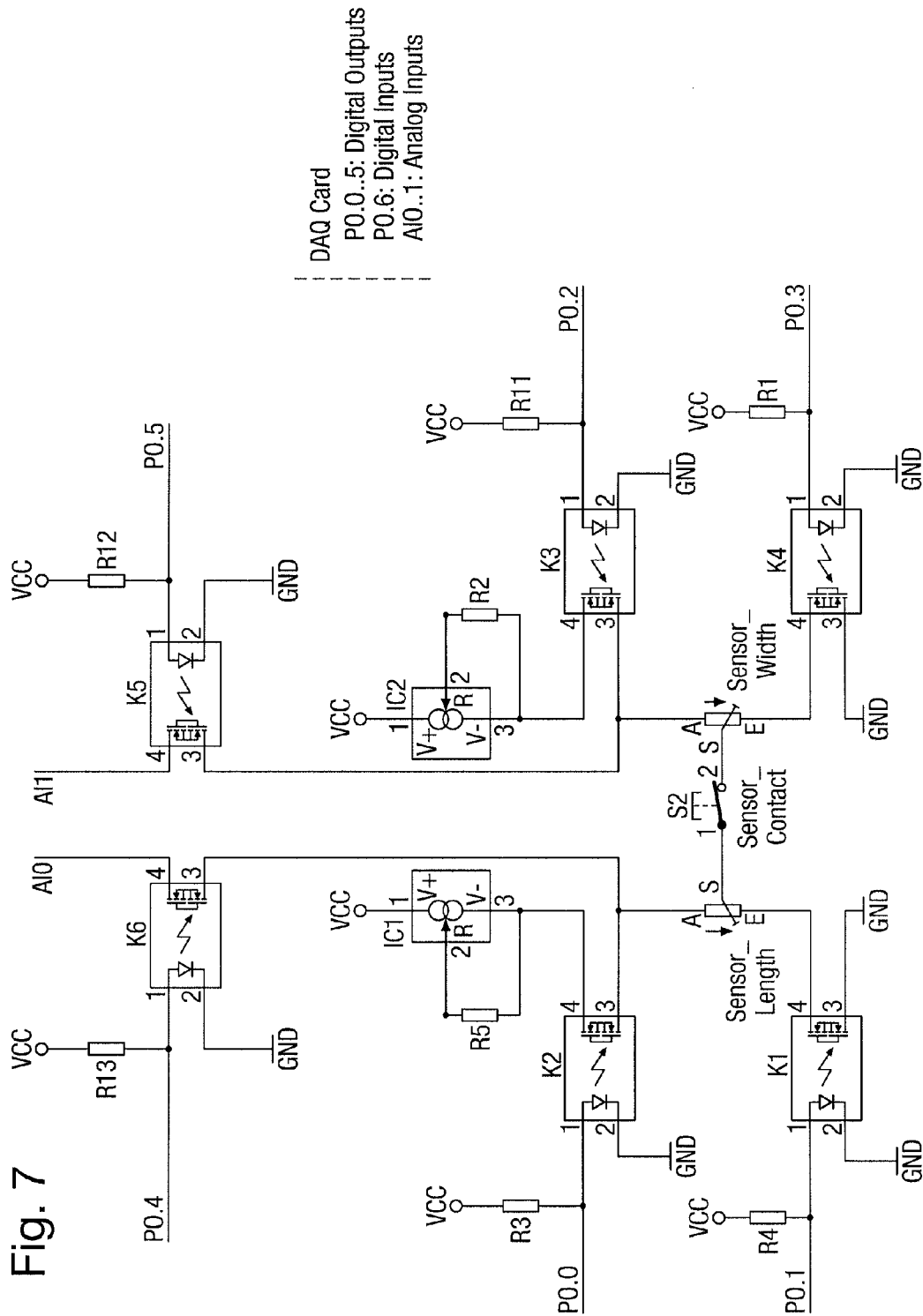
FIG. 7 shows a circuit design for an example contact sensor.

In the embodiment of FIG. 4, the circuit comprised six relays (K1 to K6, see FIG. 7). A relay is attached to each end of the resistor strips 101, 201 via the electrodes 110, 120, 210, 220. The relays control whether each resistor strip is attached to a constant current source (CCS) or not. The output of the CCS is connected to an analog to digital converter data acquisition (DAQ) card. The relays can be replaced by analog switches and the DAQ card by a microcontroller, for example.

The accumulation of static charge on the surface of the contact sensor 1 can affect the measurements since this charge will introduce high voltages through capacitive coupling. It is therefore recommended that the resistor strips 101, 201 are discharged regularly. This is achieved by connecting at least one end of each resistor strip 101, 201 to the ground for some brief period of time. The measurements can then be resumed. Alternatively, the contact sensor 1 can be covered with an aluminium foil that is grounded. In this case there is no need for a separate "discharge" step. The aluminium foil will also reduce any ambient EMI noise coming into the measuring circuit through the sensor, which can act as a (receiving) antenna.

Figure 8:
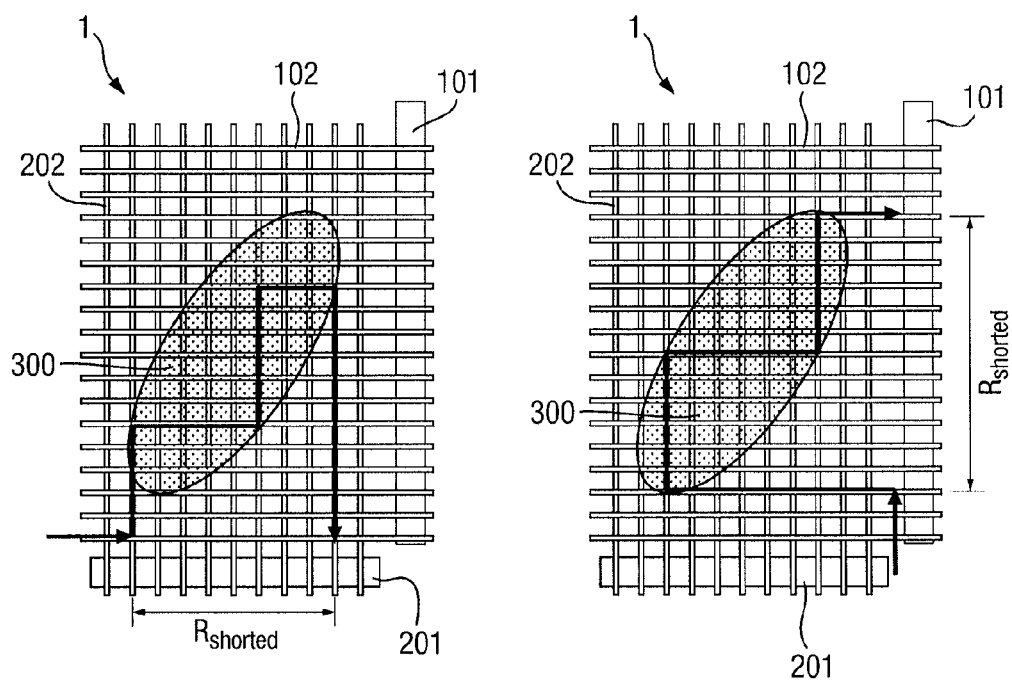
FIG. 8 is a schematic illustrating an example contact sensor with a contact applied.

FIG. 8 shows a simplified example of a sensor that is similar to that of FIG. 1. Compared to the real-world example of FIG. 4 the sensor has far fewer traces. This is done for illustrative purposes so that the operation of the sensor can be more easily understood. It will be appreciated that the methods and techniques set forth below can readily be applied to larger numbers of traces. As shown in FIG. 8, when a contact 300 is applied to the contact sensor, the conductive traces 102 of the first layer 100 touch the conductive traces 202 of the bottom layer 200 in the region of the contact 300, making an electrical contact (i.e. a short). A segment of the resistor strip 101 on the first layer 100 will be shorted by the conductive traces 202 of the second layer. Likewise, a segment of the resistor strip 201 on the second layer will be shorted by the conductive traces 102 of the first layer. The lengths of the shorted segments correspond to the length and width of the contact area 301.

The contact area 301 is defined by the points of intersection at which the contact 300 causes an electrical contact between the first and second plurality of conductive traces 102, 202. As shown in FIG. 8, the contact sensor 1 measures the maximum dimensions projected to their respective resistor strips. In essence, the contact sensor measures the outline of the smallest possible orthogonal 301 that encapsulates the whole contact 300.

Figure 9:
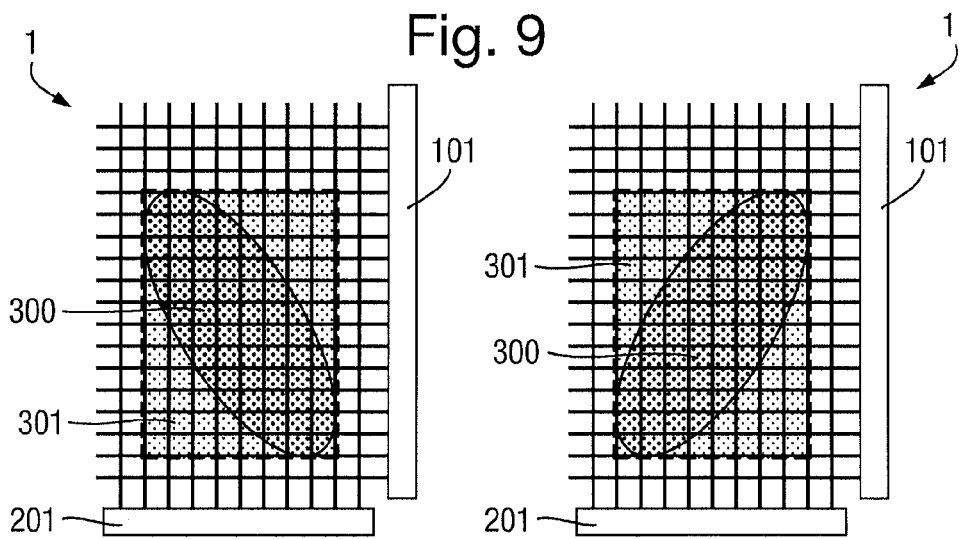
FIG. 9 shows symmetrical contact orientations on the sensor of FIG. 8 producing the same contact sensor output.

If the footprint of the contact 300 is known, a single sensor 1 can be used to detect the contact's orientation against the contact sensor 1. Nonetheless, two symmetrical orientations can result in the contact sensor 1 registering the same contact area 301 (see FIG. 9). In this case, a second sensor can be used to determine the orientation.

Figure 10:
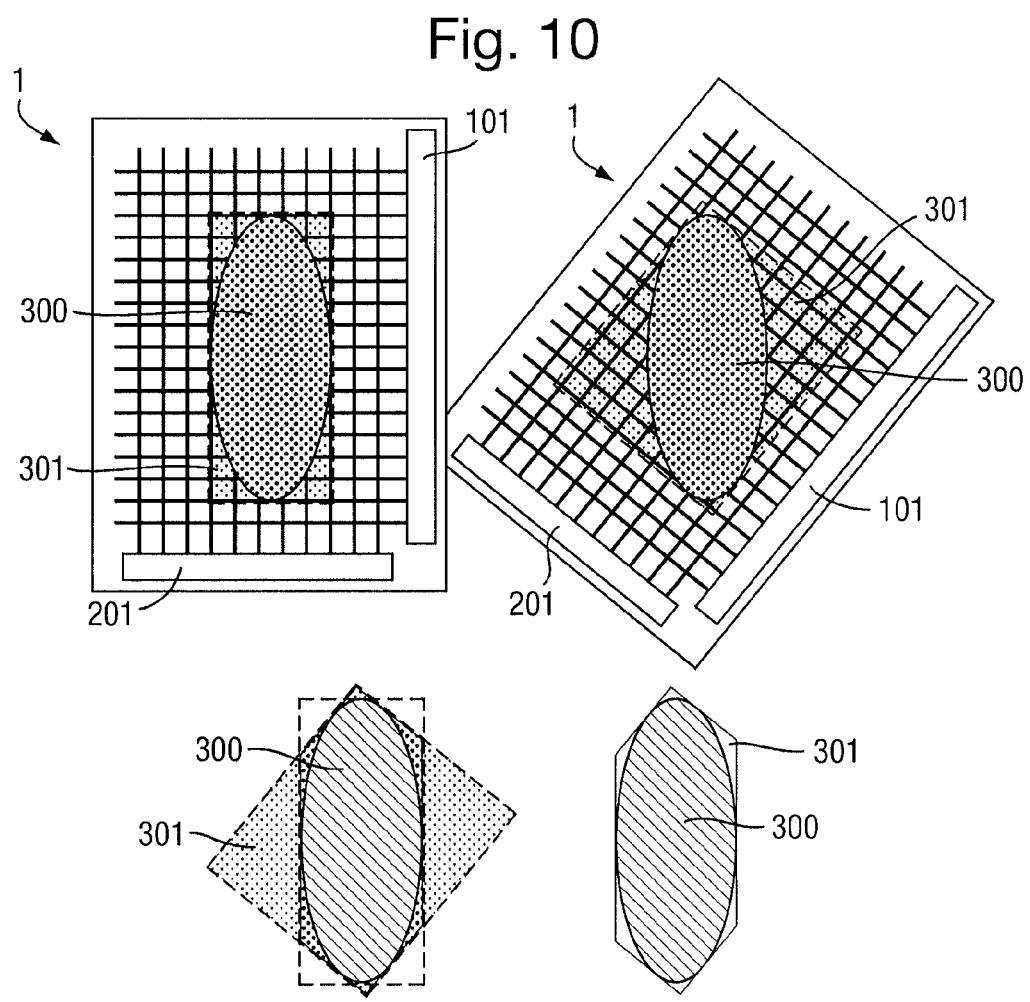
FIG. 10 shows improvement of pattern resolution by overlapping two contact sensors as in FIG. 8 at a relative angle of 45°.
Figure 11:
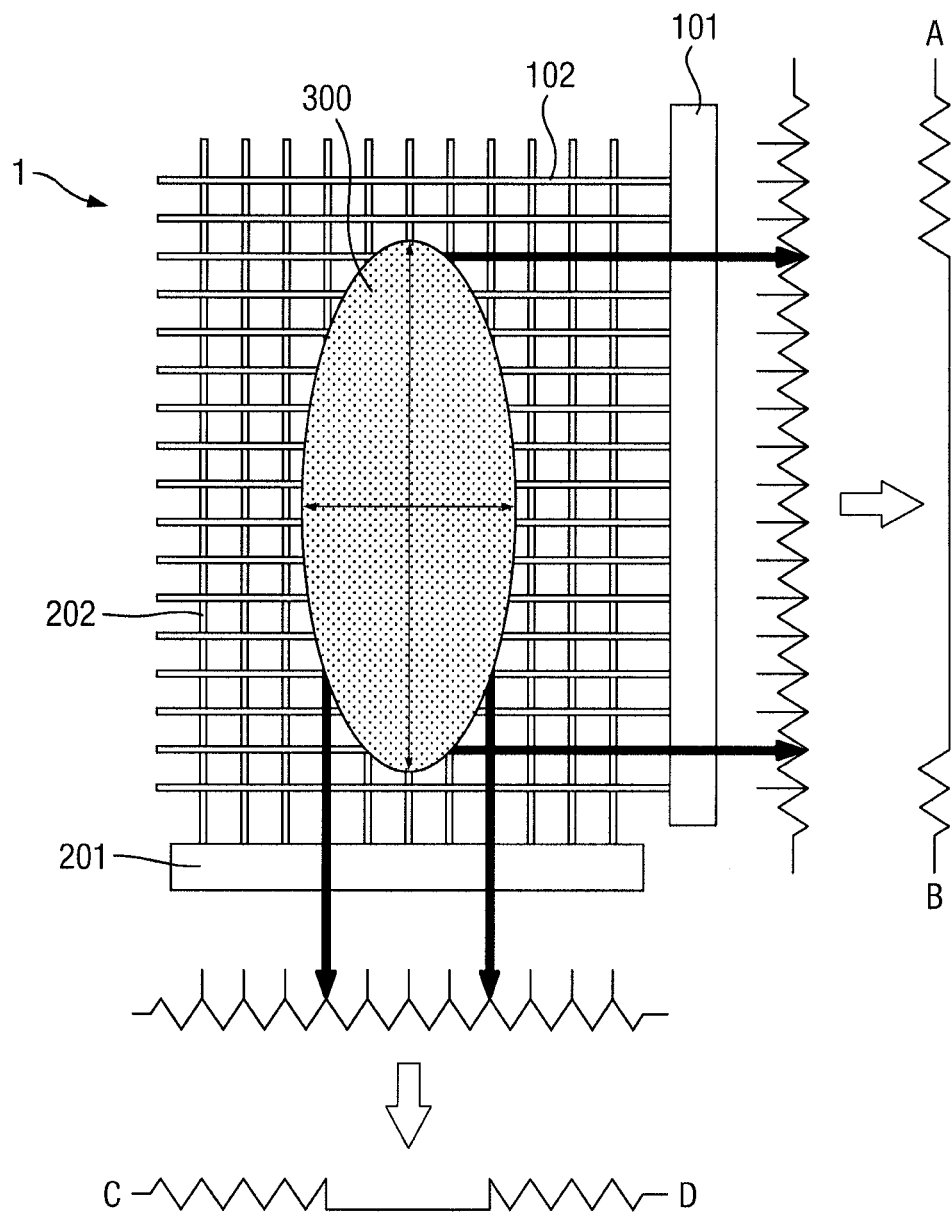
FIG. 11 shows the contact sensor of FIG. 8 with a contact applied, and the equivalent circuits, when measuring in the resistive mode.

As shown in FIG. 10, multiple contact sensors 1 can be stacked up at different angles to capture the contact area 301 with a greater definition. Every sensor will measure the maximum length/width in relation to its dimensions. The overlapping of the multiple measurements can define the contact pattern 301 in greater detail (see FIG. 10). The most preferable orientation for the second sensor is at 45° against the first sensor. A third sensor can be angled −45° against the first sensor.

There are a number of modes that the contact sensor 1 can be operated in: the resistive mode and the wiper mode. These will be discussed in further detail below with reference to FIGS. 11 to 16.

Resistive Mode

In the resistive mode, it is possible to measure the size, but not the location, of the contact area 301.

When a contact 300 is applied to the contact sensor 1, the change in the resistance of the resistor strips 101, 201 will be a monotonic function, preferably a linear function, of the contact length and width as projected to the corresponding resistor strip 101, 201. One of the resistor strips 101 determines one of the dimensions of the contact area 301 (length or width) and the other resistor strip 201 determines the other dimension. When the resistance of one of the two strips is measured, the other strip needs to be electrically isolated so that it does not introduce any parasitic voltages/currents to the first strip, which can affect the measured resistance. For each resistor strip:

$$R_{CONTACT} = \rho \frac{\text{Length}_{TOTAL} - \text{Length}_{CONTACT}}{wt} = k(\text{Length}_{TOTAL} - \text{Length}_{CONTACT}) \quad (1)$$

$R_{CONTACT}$ is the resistance of the resistor strip 101, 201 after a contact is made, p is the resistivity of the resistor strip, $\text{Length}_{TOTAL}$ is physical length of the resistor strip in question, $\text{Length}_{CONTACT}$ is the length or width of contact area 300, w is the resistor strip's width, t is the resistor's thickness and k=ρ/wt.

The factor k may vary due to manufacturing tolerances of the resistor strip's resistivity ρ and thickness t. Nonetheless, the contact sensor 1 can be self-calibrated by using the following ratio approach:

$$R_{TOTAL} = k(\text{Length}_{TOTAL}) \quad (2)$$

where $R_{TOTAL}$ is the total resistance of the resistor strip 101, 201 in question, i.e. without a contact applied.

$$\frac{R_{CONTACT}}{R_{TOTAL}} = \frac{\text{Length}_{TOTAL} - \text{Length}_{CONTACT}}{\text{Length}_{TOTAL}} \quad (3)$$

and therefore:

$$\text{Length}_{CONTACT} = \text{Length}_{TOTAL}\left(1 - \frac{R_{CONTACT}}{R_{TOTAL}}\right) \quad (4)$$

$\text{Length}_{TOTAL}$ is known (per the manufacturing specs). Therefore, measuring the pre-load initial resistance ($R_{TOTAL}$) of the resistor strip 101, 201 and its resistance when a contact 300 is applied, the contact length ($\text{Length}_{CONTACT}$) can be calculated.

It is apparent that the contact sensor 1 is self-calibrated since the contact length/width measurements are based on the ratio of the resistance values before and after the contact 300 is applied. This is very useful when the initial resistance of the strip 101, 201 can vary due to manufacturing tolerances, varying ambient conditions such as temperature and humidity, ageing, etc. The contact sensor 1 is therefore immune to the precision and/or stability of the resistor strip 101, 201, which reduces the manufacturing cost and increases the contact sensor's accuracy.

It is likely that the resistance of the discrete steps ($R_{step}$) can be affected by environmental changes such as temperature or humidity, or by ageing, etc. Nonetheless, as long as the effect is not localized, all steps will change similarly along with the total resistance of each strip 101, 201. Since all measurements capture the relative change in resistance, the contact sensor 1 is intrinsically immune to the effects of these variables.

The resistance can be measured with different circuits, e.g. voltage divider, resistance to voltage op-amp converter, resistance to frequency converter such as the 555 timer or a square wave relaxation oscillator, etc. For reasons of accuracy and simplicity a constant current source was used to apply a constant current to one resistor strip 101, 201 at a time. The longer the segment of the resistor strip that is shorted, the smaller the total resistance; therefore, the measured voltage will be lower as well, given that the current is constant. Therefore:

$$V_{TOTAL} = IR_{TOTAL} \tag{5}$$

$$V_{CONTACT} = IR_{CONTACT} \tag{6}$$

$$\frac{V_{CONTACT}}{V_{TOTAL}} = \frac{R_{CONTACT}}{R_{TOTAL}} \tag{7}$$

Substituting the above ratio in Equation (4):

$$\text{Length}_{CONTACT} = \text{Length}_{TOTAL}\left(1 - \frac{V_{CONTACT}}{V_{TOTAL}}\right) \tag{8}$$

Referring to FIG. 7, when the relays K1 and K2 are on, one end of the one of the resistor strips 101 is attached to the CCS and the other end is grounded. Relay K6 is then turned on to connect the output of the CCS to an Analog to Digital Converter (Data Acquisition Card). The voltage measured is directly proportional to the resistance of the resistor strip 101. The other resistor strip 201 is floating, therefore it does not introduce any parasitic voltages to the resistor strip 101 being measured.

To measure the other resistor strip 201, K1 and K2 are turned off and K3 and K4 are turned on. K5 is turned on and the voltage at the output of the second CCS is captured by a second analog input on the DAQ card.

There is an alternative method. In a perfectly uniform resistor strip 101, 201, all resistor steps $R_{step}$ will have the same value. In this case, when a contact short-circuits n resistor steps, the reduction of the strip's resistance will be $nR_{step}$. By measuring the drop in the resistance, the length of the contact 300 (in either direction) can be easily calculated as follows:

$$R_{TOTAL} - R_{CONTACT} = nR_{step} \Rightarrow n = \frac{R_{TOTAL} - R_{CONTACT}}{R_{step}} \tag{9}$$

Given that the contact sensor resolution is known (the conductive trace pitch), the contact length can be calculated:

$$\text{Length}_{CONTACT} = n \times \text{resolution} \tag{10}$$

Figure 12:
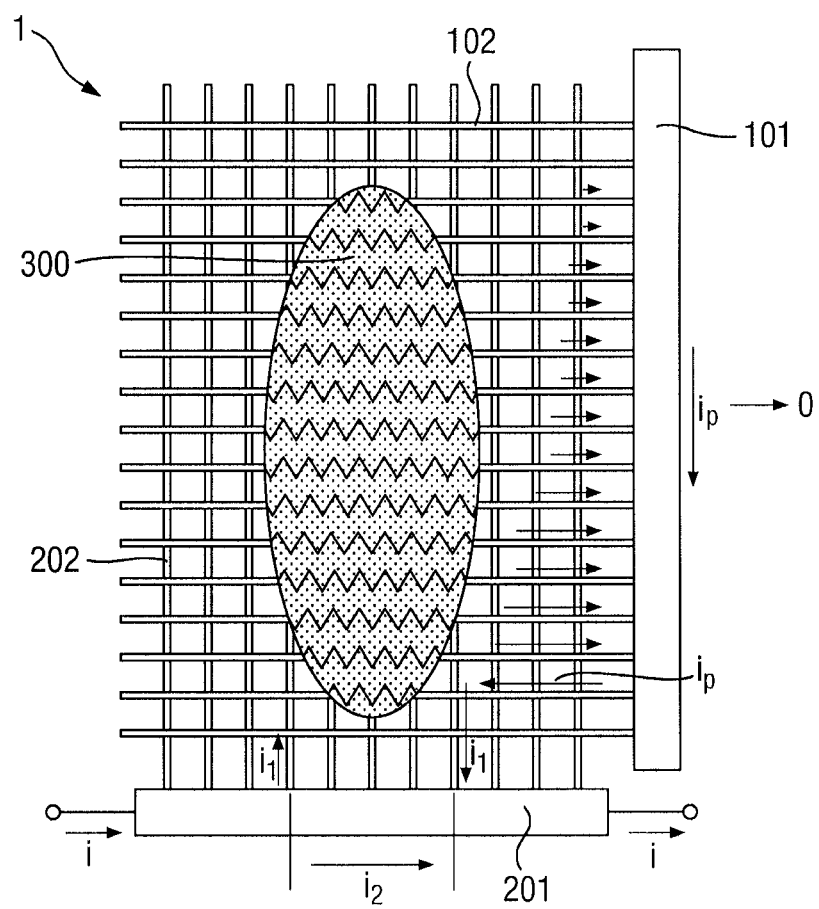
FIG. 12 shows the currents that flow when a contact is applied to the contact sensor of FIG. 8.

Referring to FIG. 12, when part of a resistor strip 101, 201 is shorted (e.g. the lower strip 201 shown in FIG. 11), some current $i_1$ will flow through the shorting conductive traces 202, some current $i_2$ will flow through the shorted portion of the resistor strip 201 and some current $i_p$ will flow through a segment of the other resistor strip 101.

The conductive traces 102, 202 should have a very low resistance in comparison to the resistance of the resistor strips 101, 201; therefore most of the current will flow through the shorting conductive traces. In fact, the greater the length of the contact area, the smaller the parallel resistance of all the shorting conductive traces and the lower the parasitic currents from the furthest steps of the strip on the other half, i.e. the steps furthest from the other of the two resistor strips. Therefore, $$i_1 \ll i_2, i_{p0} \tag{11}$$

Assuming the contact 300 is wide enough to short only two conductive traces 202 in one dimension, the equivalent electrical circuit (shown in FIG. 13) will consist of segments $R_1$ and $R_2$ of the resistor strip 201, the shorted resistance $R_{shorted}$ of the resistor strip 201, the resistance of the conductive trace $R_{trace}$ and the contact resistance $R_{contact}$ between the conductive traces at the points of intersection.

Thus the resistance of the resistor strip between points C and D shown in FIG. 13 is:

$$R_{CD} = R_1 + R_2 + \frac{(2R_{trace} + R_{contact})R_{shorted}}{(2R_{trace} + R_{contact}) + R_{shorted}} \tag{12}$$

The smaller $R_{trace}$ and $R_{contact}$ and the greater the $R_{shorted}$, the closer $R_{CD}$ is to the sum of $R_1$ and $R_2$, i.e. the last term in Equation (12), which represents the parasitic resistance tends to zero.

In the example shown in FIG. 13, $R_{shorted}$ is the minimum possible resistance step $R_{step}$, i.e., $R_{shorted} = R_{step}$.

Assuming that $R_{contact} = 0$ (which is a good approximation when the conductive traces have a low resistivity), and that $R_{trace} = R_{step}/2$, then:

$$R_{parasitic} = \frac{R_{step}^2}{2R_{step}} = \frac{R_{step}}{2} \tag{13}$$

In this case, although there is one resistor step shorted, the resistance of $R_{CD}$ will be reduced by $R_{step}/2$ because of the effect of $R_{parasitic}$. If the resistance measuring circuit has a resolution greater than $R_{step}/2$, it can detect the resistance change and register the smallest possible contact width.

The greater the number of $R_{step}$ shorted, the greater the $R_{shorted}$ and the more insignificant the effect of $R_{parasitic}$ becomes. In practice, most contacts 300 will short many $R_{step}$.

Referring to FIG. 14, when the contact 300 covers at least two points on intersection in the perpendicular direction, a section of resistor strip 101 $R_{AB}$ will be shorted as well. The minimum resistor step (change) will be $R_{step}$. $R_{step}$ is connected in parallel to the resistance of the corresponding length of conductive traces (circled in FIG. 7). Since the resistance of the shorting conductive traces is very small, the effect of $R_{step}$ is negligible. The greater the length of the shorted section of $R_{AB}$, the more negligible its effect on the resistance measured across $R_{CD}$.

With the appropriate scanning method (referred to herein as the wiper mode), the sensor can be used to measure both the contact area and the position of the contact area on the sensor.

Wiper Mode

The contact area 301 can be calculated based on the resistance measurements of the two resistor strips 101, 201, as outlined above.

Figure 15:
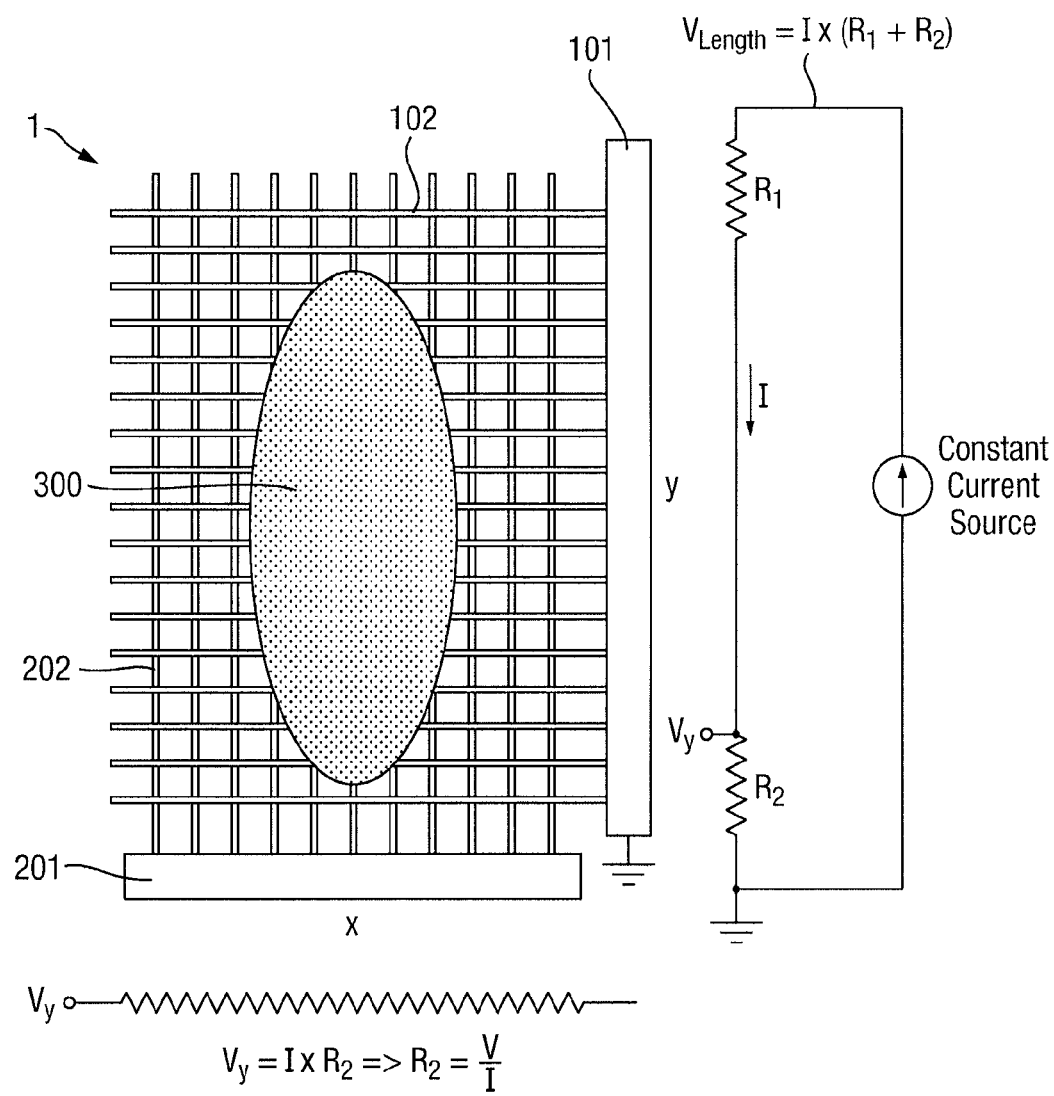
FIG. 15 shows measurement of the contact length and position in one dimension for the sensor of FIG. 8.

Referring to FIGS. 15 and 16, as an example, consider finding the location of the contact along the first resistor strip, 101. Whilst constant current I is supplied by the constant current source across the first resistor strip 101, a high impedance voltage measuring circuit can be attached to any part of the resistor/conductive trace pattern on the second layer 200. The second layer acts as a wiper electrode to identify the location of the contact across the first resistor strip 101.

Specifically, to measure the voltage drop $V_y$ across resistor $R_2$:

$$V_y = IR_2 \Rightarrow R_2 = \frac{V_y}{I} \quad (14)$$

Therefore, $$\frac{V_y}{V_{TOTAL}} = \frac{R_2}{R_{TOTAL}} = \frac{Length_{END}}{Length_{TOTAL}} \quad (15)$$

where $Length_{END}$ is the distance of the end of the contact area from the end of the resistor strip 101.

The circuit described above in relation to the resistive mode (see FIG. 7) can also be used in the wiper mode. Specifically, when the first resistor strip 101 is being measured (K1=K2=K6=On), the conductive traces 202 on the other sensor layer 200 can be connected to the $2^{nd}$ ADC and capture the voltage drop between the end of the contact on the first resistor strip 101 and its ground. Specifically, K3=K4=Off but K5=On. Since the input of the ADC is a high impedance one, this connection draws very little, if any, current. Therefore, it does not affect the resistance measurement of the first resistor strip 101. Reversing the process, the circuit can then measure the voltage drop between the end of the contact area 301 in the second resistor strip 201 and its ground. In essence, there are two voltage measurements per strip, one for the resistance and one for the position of the contact across its respective dimension. Hence, both the contact area 301 and the position can be determined.

The size of the contact area 301 can also be measured using the wiper method (instead of the resistance method). Specifically, $V_y$ measured resistance $R_2$. By reversing the current flow on the Length resistor, $V_y$ will measure the voltage drop across resistor $R_1$, therefore $R_1$ can be measured as well. From this information, the length of the contact itself can be calculated. Also, if $V_{CONTACT}$ and one of $R_1$ or $R_2$ are known, then the other resistance (other end of contact) can be determined using Equation (6).

Measurement of Force

Figure 17A:
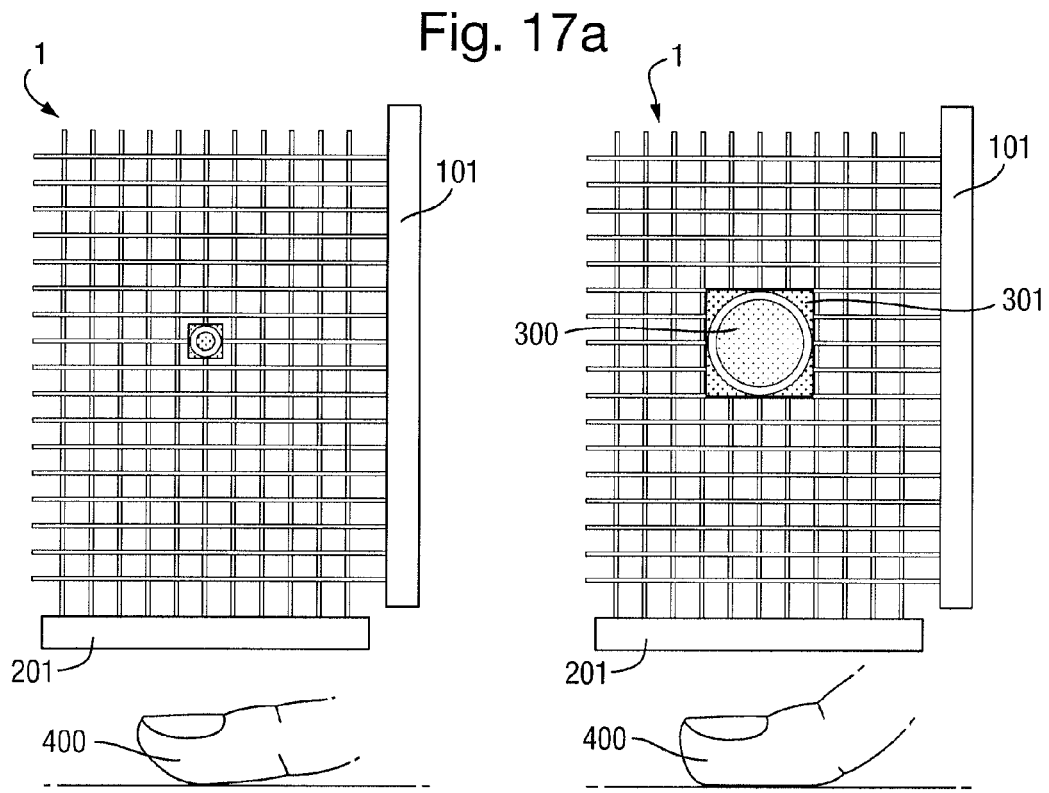
FIG. 17a shows a changing contact area associated with a changing pressure applied by a fingertip.

In a touch screen application the larger the force of the fingertip 400 on the contact sensor 1, the larger the contact area 301 (see FIG. 17a). This applies to other elastic force applicators, such as a soft ball, a rubber dome, etc. By measuring the contact area 301 and knowing the shape and elastic properties of the force applicator, the force applied can be calculated using known mechanical equations.

Figure 17B:
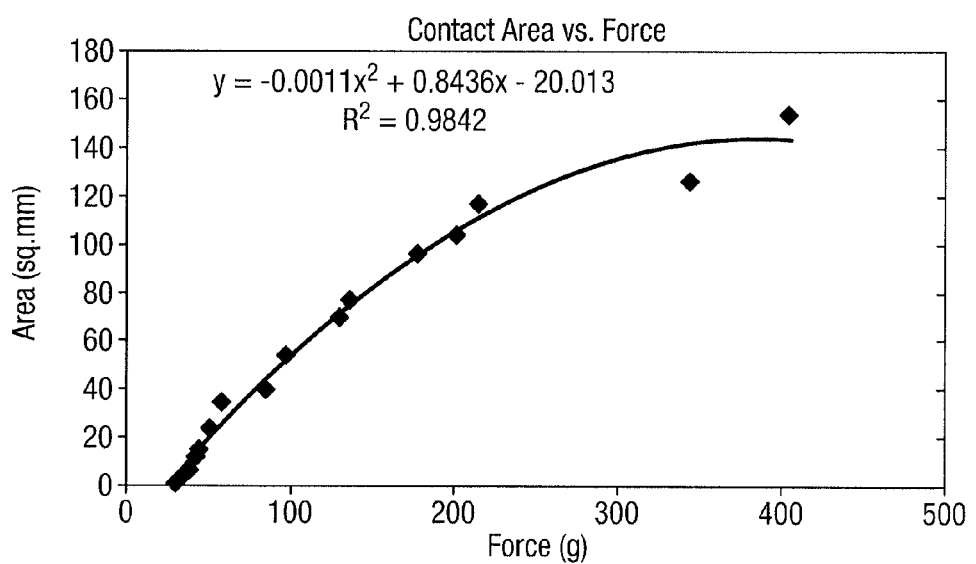
FIG. 17b shows the relationship between contact area versus fingertip force.

Nonetheless, the human fingertip 400 is a complicated part and the theoretical calculations of its elasticity can be complex. In this case, it is easier to collect experimental data that quantify the contact area versus contact force (FIG. 17b).

The sensor can be calibrated to the individual user, e.g. by asking the user to apply the minimum and maximum force he/she is comfortable with while it captures the contact area 301. With this method, a minimum force threshold can be established so that an accidental light contact is not registered as a contact. The maximum fingertip force is not expected to exceed 5N, since this will be uncomfortable to the user.

It is preferred that a touch screen system focuses on detecting force changes as opposed to measuring absolute values, e.g. a double sudden increase and reduction of the contact area could be translated to the equivalent of a "double-click" of a computer mouse. Also, it can be used to enable more advanced user interfaces such as increasing the brightness of a paint brush or of a virtual pen as the relative force the fingertip 400 applies on the touch screen is increased.

In many alternative applications, other than the touch screen, the need for force calibration is less important since the properties of the force applicators can be well known and constant, e.g. rubber sphere. In these applications, mechanical equations can be used to determine the force applied with greater accuracy.

Figure 18:
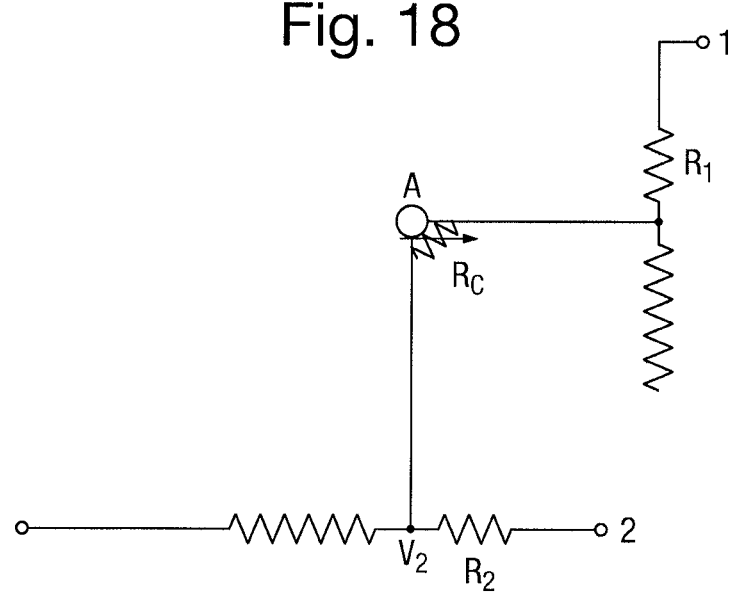
FIG. 18 shows an alternative fingertip force measurement.

An alternative method for measuring contact force is shown in FIG. 18. It has already been shown how to identify the location of the contact area. So far, the contact resistance between the shorted conductive traces has been considered negligible, which is true for conductive traces with highly conductive surfaces. If these surfaces are covered with a less conductive material or by a force sensing resistor element, the contact resistance $R_{CONTACT}$ will become significant and it will be inversely proportional to the contact force. Therefore, if $R_{CONTACT}$ is measured, the actuation force can be determined.

Measuring the resistance between points 1 and 2 (FIG. 18), results in:

$$R = R_1 + R_2 + R_{CONTACT} \quad (16)$$

e.g. the resistance can be measured by injecting a constant current into the circuit 1, 2 and measuring the voltage at point 1.

The values of resistors $R_1$ and $R_2$ can be determined using the wiper mode. Hence, $R_{CONTACT}$ is determined, which can then be used to calculate the actuation force F.

Two Contact Points

The contact sensor 1 operation discussed so far assumed the application of one continuous or nearly continuous contact 300. If more than one isolated contact areas 300, 300', 300" exist, then the contact sensor 1 will report a contact area 301 that will approximate an orthogonal that encapsulates both/all contacts 300, 300', 300".

Figure 19B:
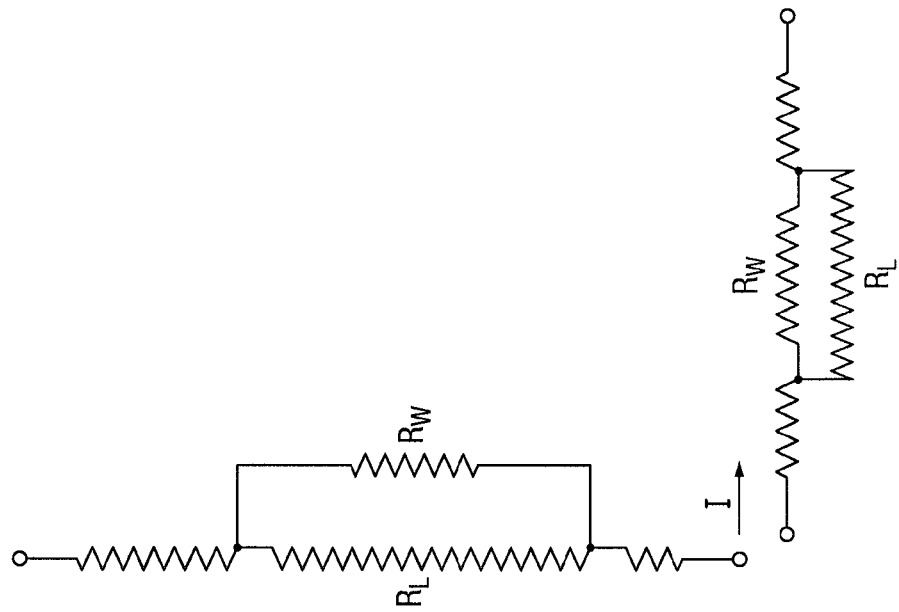
FIG. 19b shows the equivalent circuit.
Figure 19A:
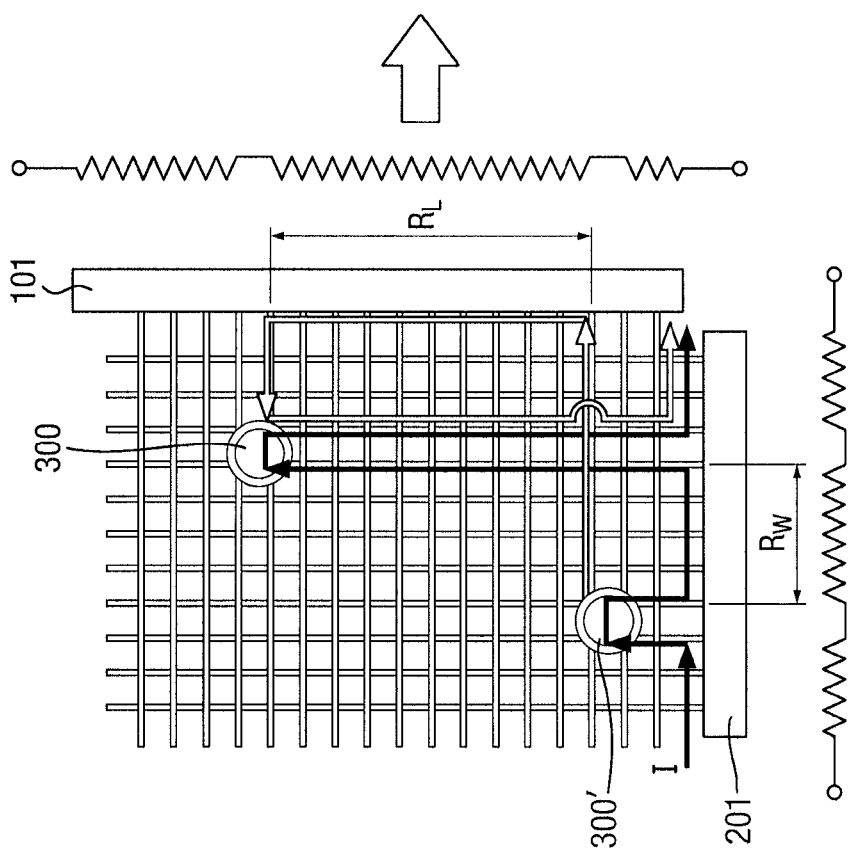
FIG. 19a shows two contact points applied to the contact sensor for the sensor of FIG. 8

Two contact points 300, 300' will create two sets of localized shorts (see FIG. 19a, and the equivalent circuit shown in FIG. 19b). In one direction, an additional leakage current will flow through resistance $R_L$, which is the resistance of the first resistor strip 101 that separates the two contact points 300, 300'. The effect is the same in measuring the resistance across the other direction, i.e. there will be a parasitic resistive path across resistance $R_W$, which is the resistance of the second resistor strip 201 that separates the two contact points 300, 300'.

Figure 20:
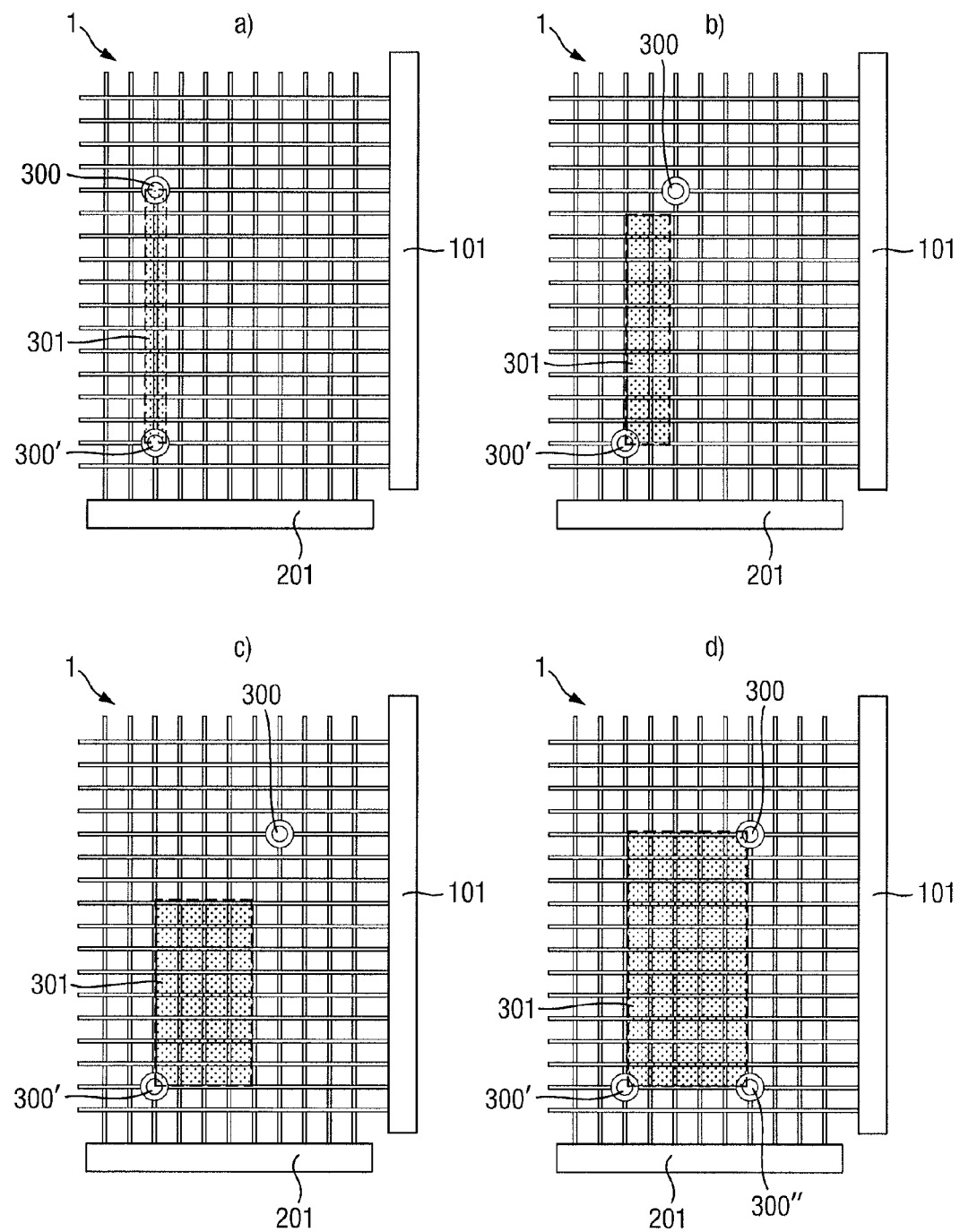
FIG. 20a-20d show the contact sensor output for the sensor of FIG. 8 resulting from multiple sensor contact points.

FIG. 20a shows the area 301 the sensor would measure if the two contact points 300, 300' lined up their projections to the second resistor strip 201. As the contact points start drifting apart in the width direction, i.e. along the length of the second strip 201, see FIG. 20b, the total shorted length of the second resistor strip 201 will increase and a parasitic conductive path will be formed across the first resistor strip 101. Both these effects will reduce the measured resistance across the second strip 201, which will be translated to an increased contact length in the direction along the second strip 201.

In the other direction, $R_L$ will remain constant but $R_W$ will increase, therefore the measured resistance will increase; this will be translated to a shorter contact length. FIG. 20c shows the exaggerated effect.

In a single dimension sensor, i.e. when the top sheet is a uniform conductive layer, the above problem of parasitic resistive paths does not exist. Regardless of the location of the contact points, the sensor will register the maximum distance between the two contacts.

The addition of a third contact point, see FIG. 20d, at any cross-section of the projections of the points to the two resistor strips 101, 201 will eliminate the parasitic resistive paths and recover the accuracy of the contact sensor 1, i.e. the contact sensor 1 will report a contact area 301 equivalent to the smallest orthogonal that encapsulates all contact points 300, 300', 300".

The greater the number of contact points, the weaker the parasitic current effect and the more accurate the contact sensor 1 output will be, since the contact points 300, 300', 300" will start simulating a continuous contact area 301.

In touch screen applications, the previous operation can be useful in detecting two fingertips 400 getting closer together or further apart (zoom in and zoom out functions), since the measured contact area 301 will decrease or increase respectively. In fact, the contact sensor 1 can work with all five fingers coming together or spreading out. Nonetheless, modern human-computer interfaces can benefit from the accurate determination of the location of two fingertips A and B on the touch screen.

Figure 21:
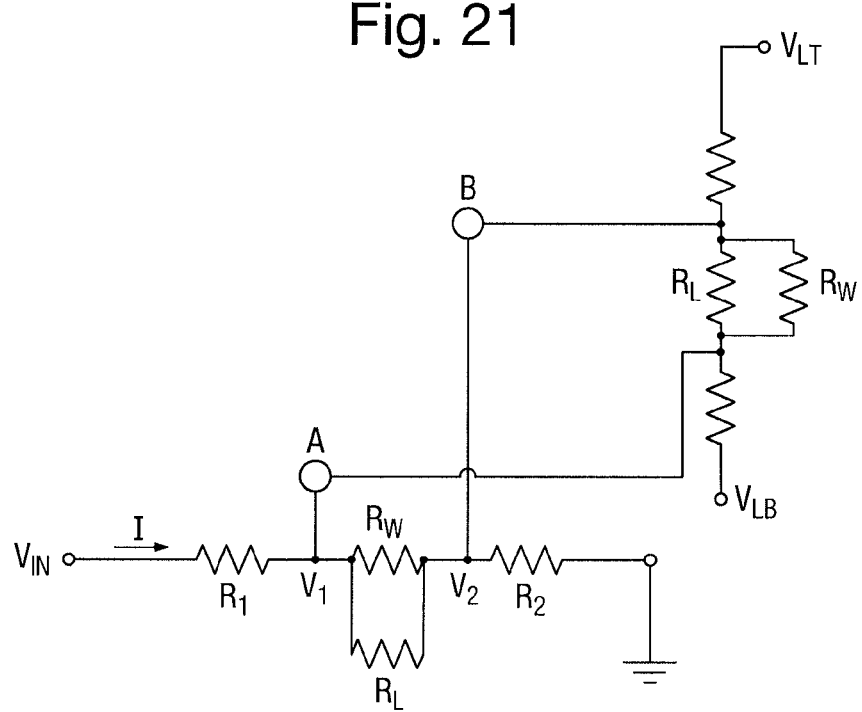
FIG. 21 shows an equivalent circuit for measuring the location of two contact areas on the example sensor of FIG. 8.

An enhanced sensor scanning method can be used to achieve this capability. The method is explained below with reference to FIG. 21.

A constant current I is injected into resistor strip 201 whereas the top end of the other resistor strip 101 is attached to a voltage meter and the bottom is left floating so that it does not introduce any currents into the circuit. The meter will measure voltage $V_2$ across resistor $R_2$, i.e.

$$V_{LT} = V_2 \quad (17)$$

Next, the bottom end of the resistor strip 101 is attached to a voltage meter whereas the top end is left floating. The meter will measure voltage $V_1$ across $R_W$ and $R_L$ in parallel, and $R_2$, i.e.

$$V_{LB} = V_1 \quad (18)$$

If point B is to the left of point A, then $$V_{LT} = V_1 \quad (19)$$

$$V_{LB} = V_2 \quad (20)$$

Since $V_1$ is always greater than $V_2$, the system can determine if Point B is to the left or the right of Point A. Specifically, if $V_{LT} < V_{LB}$ then B is to the right of A and if $V_{LT} > V_{LB}$ then B is to the left of A.

In addition, the exact position of points A and B across the Width dimension can be determined using Ohm's Law:

$$R_1 = \frac{V_{IN} - V_1}{I} \quad (21)$$

$$R_2 = \frac{V_2}{I} \quad (22)$$

Of course, $V_{IN}$ needs to be measured since it varies to keep the current constant.

Alternatively, the direction of the current flow can be reversed to measure directly the voltage drop across resistor $R_1$. By knowing $R_1$ and $R_2$ the distance of the points from the ends is also known. Therefore, the exact position of points A and B across the first dimension is known.

The same approach is followed to calculate the position of points A and B across the second dimension. Therefore, the exact coordinates of both contact points are determined.

This approach requires more complex electronics to allow the ends of both resistor strips to be connected to a voltage meter, to the ground, to be left floating or to be attached to a constant current source. In exchange, the contact sensor 1 can differentiate and locate two separate contact points 300, 300'.

If the greater accuracy is not required, e.g. detecting the contact area 301 and general position of multiple fingers is adequate, then the wiper mode can be used instead. Finger gestures such as "zooming in/out" or "pinching" an item to move it around can still be recognized.

Figure 22:
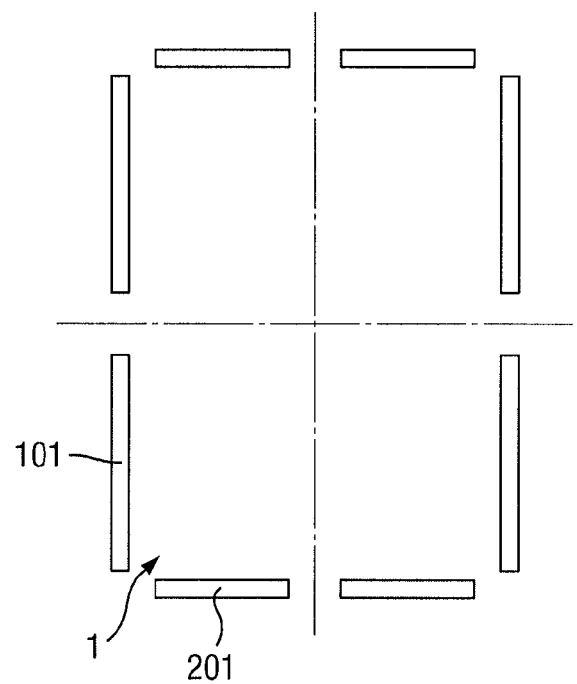
FIG. 22 shows a larger contact sensor area made up of four individual contact sensors.

Multiple contact sensors 1 can be tiled together (see FIG. 22) to allow the identification of multiple contact points 300, 300', 300", as long as no more than 2 points need to be detected per sensor tile. To minimize the gap between the sensor tiles, it is preferred the resistor strips to be on two adjacent sides of the sensing area. This way four tiles can be connected together with a minimum gap between them, which reduces the "dead" areas on the sensing surface.

Alternatively, a software algorithm can be used to track the contact sensor 1 output and determine if there is a third contact or not, e.g. assuming two fingers touch the sensor, the introduction of a third finger will lead to a sudden increase in the contact area 301. The detection of this discontinuity can be related to the introduction of the third contact 300".

One-Dimensional Sensor

Figure 23A:
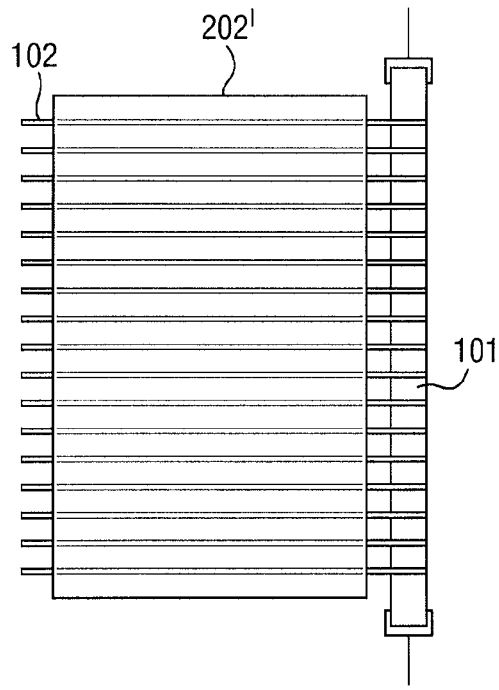
FIG. 23a shows a one-dimensional sensor with a resistor strip provided adjacent to the ends of the conductive traces.
Figure 23B:
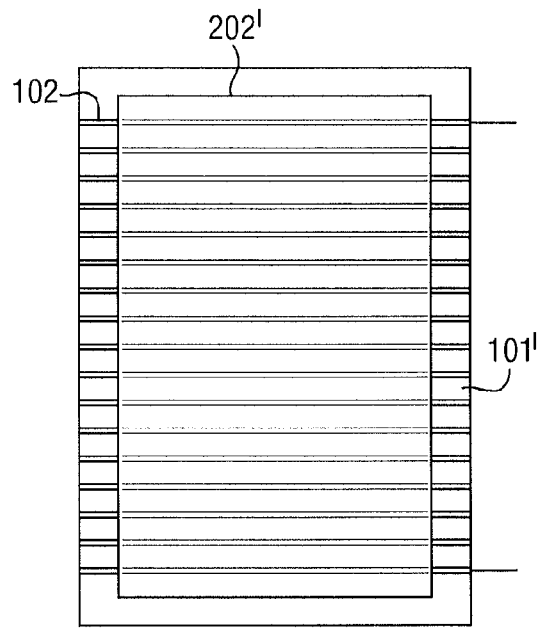
FIG. 23b shows an alternative one-dimensional sensor with a resistor layer extending across the conductive traces.

FIG. 23a shows a simplified version of the sensor that can be produced by replacing one half of the sensor with a continuous conductive layer 202', e.g. a metallic foil. When a contact is applied, this layer 202' will short the conductive traces 102 on the other half of the sensor, thereby allowing the measurement of a contact in one dimension only by measuring the change in resistance across the resistor strip 101. An alternative embodiment is shown in FIG. 23b, which shows a sensor in which the resistor strip is provided as a resistor layer 101'. In a further alternative (not shown) the continuous conductive layer may be replace by tightly spaced conductive traces. The conductive traces may be connected by a conductive bar. In further alternative (also not shown), the parallel conductive lines could be replaced by a mesh/grid-like pattern.

Thus, the resistor strip (layer) can extend all the way into the sensing area. The benefit of this design is that the sensing area can cover nearly the whole width of the sensor device leaving a very small margin all around for the adhesive and the electrode traces to be routed to the connector. This creates a nearly borderless sensor. Aside from maximizing the sensing area, the resistive steps are likely to have a more uniform resistance since the effect of localized imperfections in the manufacturing process will have very little effect in the total resistance of the physically wider steps.

In the borderless design, attention should be paid to the absolute resistance value since a wider strip will have a lower resistance; the resistivity of the conductive material that forms the strip may have to be adjusted to suit the needs of the application/circuit.

A suitable application for the one-dimensional sensor is the measurement of the nip width between rollers.

To measure the location/area of the contact, a resistance meter is placed across the ends of the resistor strip 101. The change in resistance on application of a contact is proportional to the length of the contact. The resistance between the conductive layer 202' and each of the ends of the resistor strip 101 is then measured. The resistance measured is proportional to the distance of the contact area from each end. In essence, the conductive layer 202' acts as a shorting wiper in a planar potentiometric device.

Figure 24:
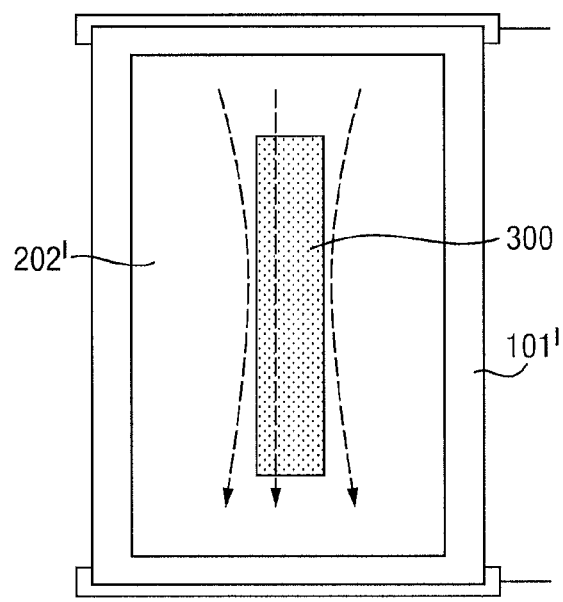
FIG. 24 shows a prior art one-dimensional sensor.

FIG. 24 shows a prior art sensor as described in U.S. Pat. No. 6,225,911 B1. This prior art nip width sensor does not include conductive traces 102. The prior art sensor will work well if the length of the nip contact is larger than the width of the sensor/resistor strip. If the contact 300 covers only part of the sensor width (as shown in FIG. 24), then only part of the width of the resistor strip/layer will be shorted and there will be significant parasitic current paths around the contact; this will affect the accuracy of the sensor.

In contrast, the addition of the conductive traces ensures that the whole width of the resistor layer is shorted even when part of it is loaded; this eliminates all parasitic conductive paths, which improves the sensor's accuracy significantly.

Applications

The contact sensor apparatus can be used in a wide variety of applications. For example, the contact sensor apparatus may be integrated into a foot measuring device capable of measuring the dimensions of a foot. The contact sensor apparatus may also be used in touch-screen applications.

The contact sensor apparatus can also be used to create interfaces such as very thin keyboards (the position and size of keys can be fully customized by the user), dancing mats (to detect the position of footsteps), computer game mats, smart floors (to detect location of elderly people or to track the location of a visitor), etc.

In other embodiments, the contact sensor apparatus may be implemented as a seat occupancy sensor for a vehicle. In such embodiments, the sensor is integrated into the vehicle's seats. Based on the contact area and force, or the detection of a changing contact area (a live person will be moving) the vehicle's airbag deployment system can differentiate an adult from a child or from an object. In case of an accident, the speed of the airbag's deployment can be adjusted as a function of the person's size or cancelled altogether in case that the seat is loaded by an object.

The contact sensor can measure contact length, width and force at very fast rates, which is ideal for investigating high speed phenomena, e.g. ballistic analysis, car crash tests, etc.

The invention claimed is:

1. A contact sensor apparatus, the sensor comprising:
a first insulative layer;
a second insulative layer;
a first resistor strip on the first insulative layer;
a second resistor strip on the second insulative layer;
a plurality of first conductive traces provided on the first insulative layer and electrically connected to the first resistor strip; and
a plurality of second conductive traces provided on the second insulative layer and electrically connected to the second resistor strip;
wherein the first insulative layer and second insulative layer face each other such that the plurality of first conductive traces face the plurality of second conductive traces with each of the first conductive traces extending across the plurality of second conductive traces and each of the second conductive traces extending across the plurality of first conductive traces thereby forming an array of points of intersection of the first and second conductive traces,
wherein the first insulative layer and second insulative layer are spaced apart such that there is no electrical contact between the plurality of first and second conductive traces when a contact is not applied to the contact sensor,
wherein when a contact is applied there is an electrical contact between at least one of each of the plurality of first and second conductive traces in a region of the contact, and
wherein when the contact is applied to the apparatus, the apparatus is operable to determine the dimensions of the contact as projected to the first and second resistor strips by measuring an electrical quantity across the first and second resistor strips.

2. An apparatus as claimed in claim 1, wherein the apparatus is further operable to compare the electrical quantity to the same electrical quantity measured when no contact is applied.

3. An apparatus as claimed in claim 1, wherein the apparatus is configured to determine a force or a change in force applied by the contact;
preferably wherein the apparatus is configured to use the determination of the dimensions of the contact to determine a force or a change in force applied by the contact, or wherein the surfaces of the conductive traces are covered by a force sensing resistor element such that a contact resistance between the conductive traces at each point of intersection is inversely proportional to the contact force.

4. An apparatus as claimed in claim 1, wherein the apparatus is operable to determine a location of the contact along each dimension, wherein the apparatus is configured to:
a) apply a constant current across a resistor strip;
b) connect a high impedance voltage measuring circuit to the other resistor strip or corresponding conductive trace pattern; and
c) measure the voltage drop over a part of the resistor strip extending from an end of the resistor strip to an edge of the contact to thereby determine the length of this part of the strip.

5. An apparatus as claimed in claim 1, wherein the apparatus is operable to determine a location of the contact along each dimension, the apparatus comprising:
a constant voltage source; and
a known-value resistor provided between the constant voltage source and the resistor strip;
wherein the apparatus is configured to:
a) apply a constant voltage across the known-value resistor and the resistor strip;
b) measure the voltage drop across the known-value resistor;

c) determine the current through the known-value resistor and resistor strip from the measured voltage drop and known resistance of the known-value resistor;

d) connect a high impedance voltage measuring circuit to the other resistor strip or corresponding conductive trace pattern; and e) measure the voltage drop over a part of the resistor strip extending from an end of the resistor strip to an edge of the contact to thereby determine the length of this part of the strip.

6. An apparatus as claimed in any preceding claim 1, wherein the first and second resistor strips comprise a conductive connector connected to an electrical meter operable to make an electrical measurement to establish a size and/or a location of a contact.

7. An apparatus as claimed in claim 6, wherein each of the first and second resistor strips comprises a first and second end, and each of the first and second ends is connected by the conductive connector to the electrical meter.

8. An apparatus as claimed in claim 6, wherein each of the first and second resistor strips comprises a first and second end, and each of the first and second ends is connected by the conductive connector to a voltage source, a current source or ground or floating.

9. An apparatus as claimed in any preceding claim 1, wherein the resistance of each of the plurality of first and second conductive traces is less than the resistance of each step of the resistor strip across the spacing between adjacent conductive traces, and preferably wherein the resistance of each of the plurality of first and second conductive traces is at least two times less than the resistance of each step of the resistor strip across the spacing between adjacent conductive traces.

10. An apparatus as claimed in any preceding claim 1, wherein the resistance of each of the plurality of first and second conductive traces is at least five times less than the resistance of each step of the resistor strip across the spacing between adjacent conductive traces.

11. An apparatus as claimed in any preceding claim 1, wherein the plurality of first conductive traces are spaced regularly along the first resistor strip by a first spacing, and the plurality of second conductive traces are spaced regularly along the second resistor strip by a second spacing.

12. An apparatus as claimed in any preceding claim 1, wherein the first and second resistor strips have equal resistance per unit length.

13. An apparatus as claimed in any preceding claim 1, wherein the first and second conductive traces cross at an angle of at least 10°, preferably wherein the angle is 90°.

14. An apparatus as claimed in any preceding claim 1, wherein the first insulative layer and second insulative layer are resiliently spaced apart.

15. An apparatus as claimed in claim 14, wherein the first insulative layer and second insulative layer are resiliently spaced apart by a spacing structure between the first and second insulative layers.

16. An apparatus as claimed in claim 15, wherein the spacing structure is a series of electrically insulative dots, or an electrically insulative grid, or wherein the spacing structure is a resistive layer.

17. An apparatus as claimed in any preceding claim 1, wherein the contact sensor is flexible.

18. A method for determining a size of a contact applied to an apparatus as claimed in claim 1, comprising, when the contact is applied to the apparatus, determining the dimensions of the contact as projected to the first and second resistor strips by measuring an electrical quantity across the first and second resistor strips.

19. A method of manufacturing a contact sensor apparatus, the method comprising:

providing a first insulative layer;

providing a second insulative layer;

providing a first resistor strip on the first insulative layer;

providing a second resistor strip on the second insulative layer;

providing a plurality of first conductive traces on the first insulative layer to be electrically connected to the first resistor strip; and providing a plurality of second conductive traces on the second insulative layer to be electrically connected to the second resistor strip, wherein the first insulative layer and second insulative layer are arranged to face each other such that the plurality of first conductive traces face the plurality of second conductive traces with each of the first conductive traces extending across the plurality of second conductive traces and each of the second conductive traces extending across the plurality of first conductive traces, thereby forming an array of points of intersection of the first and second conductive traces, wherein the first insulative layer and second insulative layer are spaced apart such that there is no electrical contact between the plurality of first and second conductive traces when a contact is not applied to the contact sensor, wherein when a contact is applied there is an electrical contact between at least one of each of the plurality of first and second conductive traces in a region of the contact, and wherein when the contact is applied to the apparatus, the apparatus determines the dimensions of the contact as projected to the first and second resistor strips by measuring an electrical quantity across the first and second resistor strips.

20. The apparatus as claimed in claim 1, wherein the apparatus is operable to determine the location of two contacts.

* * * * *